United States Patent
Toyoshima

(10) Patent No.: US 12,148,945 B2
(45) Date of Patent: Nov. 19, 2024

(54) OPERATING DEVICE

(71) Applicant: SONY INTERACTIVE ENTERTAINMENT INC., Tokyo (JP)

(72) Inventor: Takeshi Toyoshima, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 89 days.

(21) Appl. No.: 17/793,673

(22) PCT Filed: Feb. 15, 2021

(86) PCT No.: PCT/JP2021/005427
§ 371 (c)(1),
(2) Date: Jul. 19, 2022

(87) PCT Pub. No.: WO2021/166827
PCT Pub. Date: Aug. 26, 2021

(65) Prior Publication Data
US 2023/0065028 A1 Mar. 2, 2023

(30) Foreign Application Priority Data
Feb. 17, 2020 (JP) ................................ 2020-024388

(51) Int. Cl.
*H01M 50/264* (2021.01)
*H01M 50/247* (2021.01)
*H01M 50/271* (2021.01)

(52) U.S. Cl.
CPC ....... *H01M 50/264* (2021.01); *H01M 50/247* (2021.01); *H01M 50/271* (2021.01); *H01M 2220/30* (2013.01)

(58) Field of Classification Search
CPC ............. H01M 50/264; H01M 50/247; H01M 50/271; H01M 2220/30; H01M 50/213; Y02E 60/10
See application file for complete search history.

(56) References Cited

U.S. PATENT DOCUMENTS 4,413,219 A * 11/1983 Ducharme ............ H01M 10/46
320/DIG. 34
2012/0028095 A1 2/2012 Wang et al.
(Continued)

FOREIGN PATENT DOCUMENTS

| CN | 205232627 A | 5/2016 |
| JP | 2006049049 A | 2/2006 |

(Continued)

OTHER PUBLICATIONS

Decision to Grant a Patent drafted Jun. 21, 2023, from Japanese Patent Application No. 2020-024388, 3 sheets.
(Continued)

*Primary Examiner* — Patrick N Edouard
*Assistant Examiner* — Joseph P Fox
(74) *Attorney, Agent, or Firm* — XSENSUS LLP

(57) ABSTRACT

An operating device (1) having a housing (3) is provided, and the housing (3) is equipped with a housing body (4), a lid member (7) that slides in a first direction with respect to the housing body (4) to be mounted to the housing body (4) and slides in the direction opposite to the first direction to be separated from the housing body (4), and a locking member (8) that is provided to the housing body (4) and that locks the lid member (7), and the locking member (8) has a mounting portion (81) attached to the housing body (4), a hinge portion (82) connected to the mounting portion (81), an operating portion (84) that is connected to the hinge portion (82) and that moves around the hinge portion (82) so as to be insertable into and projectable from the housing body (4), and a regulating portion (853) that comes in contact with the lid member (7) so as to restrict sliding of the lid member (7) in the direction opposite to the first direction, and upon insertion of the operating portion (84) into the housing body (4), the regulating portion (853) is moved together with the (Continued)

operating portion (84) and separated from the lid member (7).

9 Claims, 15 Drawing Sheets

(56) References Cited

U.S. PATENT DOCUMENTS

2013/0249729 A1    9/2013  Das et al.
2016/0172640 A1*  6/2016  Kadowaki ........... H01M 50/271
                                                                           429/100

FOREIGN PATENT DOCUMENTS

| JP | 2007227045 A | 9/2007 |
|----|--------------|--------|
| JP | 2010093478 A | 4/2010 |
| JP | 2012033489 A | 2/2012 |
| KR | 2012026982 A | 11/2012 |
| TW | M280542 U | 11/2005 |

OTHER PUBLICATIONS

International Search Report and Written Opinion mailed May 18, 2021, from PCT/JP2021/005427, 8 sheets.
CNIPA First Office Action mailed Jul. 17, 2024 for Chinese Application No. CN202180007455.4 (14 pages; with English translation).

* cited by examiner

OPERATING DEVICE

TECHNICAL FIELD

The present invention relates to an operating device.

BACKGROUND ART

In the past, a remote control device having a housing is known (see, for example, PTL 1).

Regarding the remote control device described in PTL 1, the housing has a front portion, a back cover, and a battery lid. The front portion has a battery installation portion in which a battery is installed and fitting recesses formed on the back side peripheral portion. The back cover is installed so as to cover the back side of the front portion. At the end of the side wall of the back cover, a frame portion having an opening for exposing the battery installation portion is integrally formed. An engaging hole is formed on the side wall. The battery lid is mounted so as to cover the frame portion of the back cover and the battery installation portion of the front portion. An engaging claw portion is provided on an upper end of the battery lid, and two fitting projections are provided on an inner peripheral portion of the battery lid.

When the fitting projection of the battery lid is fitted into the fitting recess of the front portion and the battery lid is slid from a bottom surface side to an upper surface side of the housing, the engaging claw portion of the battery lid is locked at the engaging hole of the back cover. As a result, the battery lid is attached.

In the battery lid, by pushing down the back face end near the locking claw portion toward a front side to release the locked state between the engaging hole of the back cover and the engaging claw portion of the battery lid, and when the battery lid is slid to the bottom side of the housing, the engagement between the fitting recess of the front portion and the fitting projection of the battery lid is released. As a result, the battery lid is removed.

CITATION LIST

Patent Literature

[PTL 1]
JP 2006-049049A

SUMMARY

Technical Problem

However, the remote control device described in PTL 1 has a problem that the battery lid is easily removed when the engaging claw portion of the battery lid to be inserted into the engaging hole of the back cover deteriorates due to wear or the like.

An object of the present invention is to solve at least a part of the above problem, and one object is to provide an operating device on which a lid member can be stably mounted.

Solution to Problem

The operating device according to one aspect of the present invention is an operating device including a housing, and the housing includes a housing body, a lid member that slides in a first direction with respect to the housing body to be attached to the housing body and slides in the direction opposite to the first direction to be detached from the housing body, and a locking member provided on the housing body and locking the lid member, and the locking member has a mounting portion attached to the housing body, a hinge portion connected to the mounting portion, an operating portion that is connected to the hinge portion, moves around the hinge portion, and can be inserted into and can protrude from the housing body, and a regulating portion that comes into contact with the lid member and restricts sliding of the lid member in the opposite direction, and the regulating portion is moved together with the operating portion and separated from the lid member when the operating portion is inserted into the housing body.

According to such a configuration, the lid member can be stably attached to the housing body.

DESCRIPTION OF EMBODIMENT

Hereinafter, an embodiment of the present invention will be described with reference to the drawings.

[Outline Configuration of Operating Device]

Figure 1:
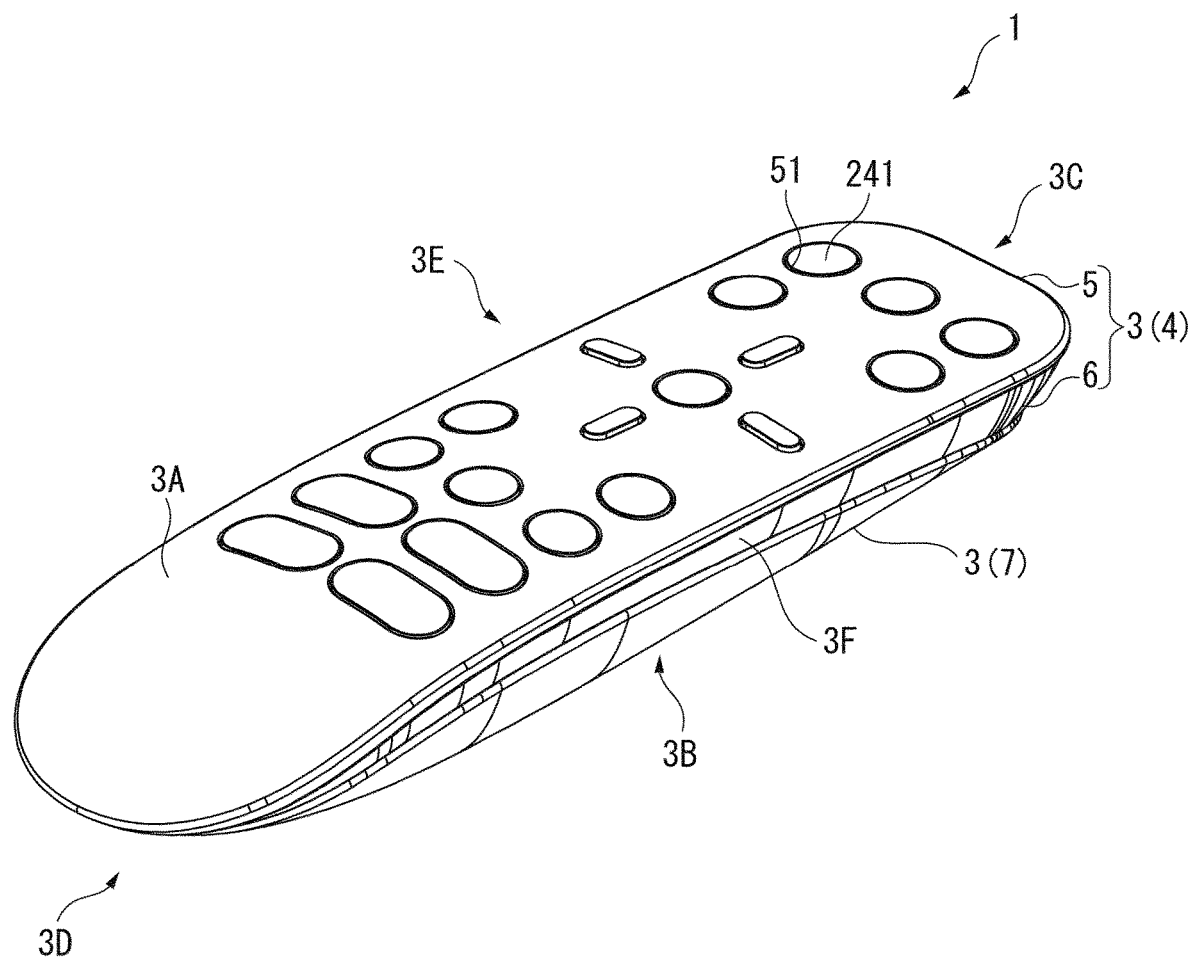
FIG. 1 is a perspective view illustrating an operating device according to an embodiment.
Figure 2:
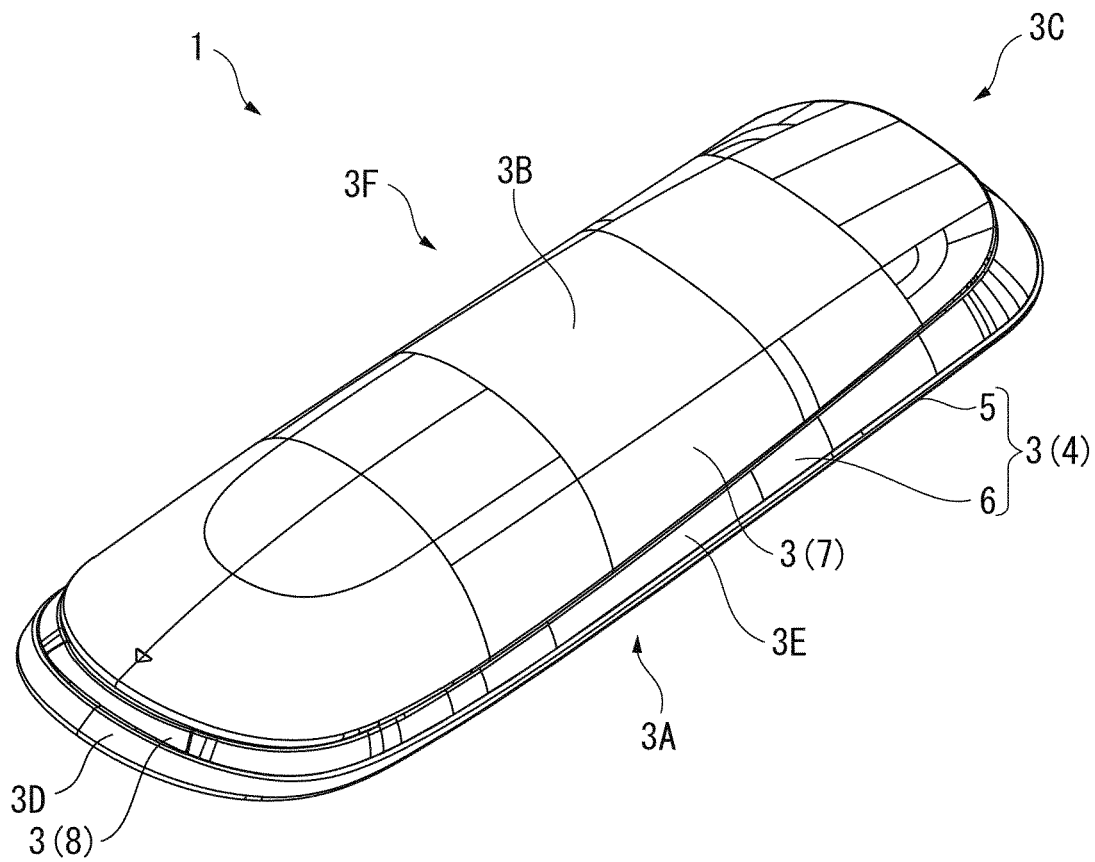
FIG. 2 is a perspective view illustrating the operating device according to an embodiment.
Figure 2:
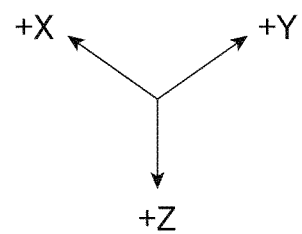
Figure 3:
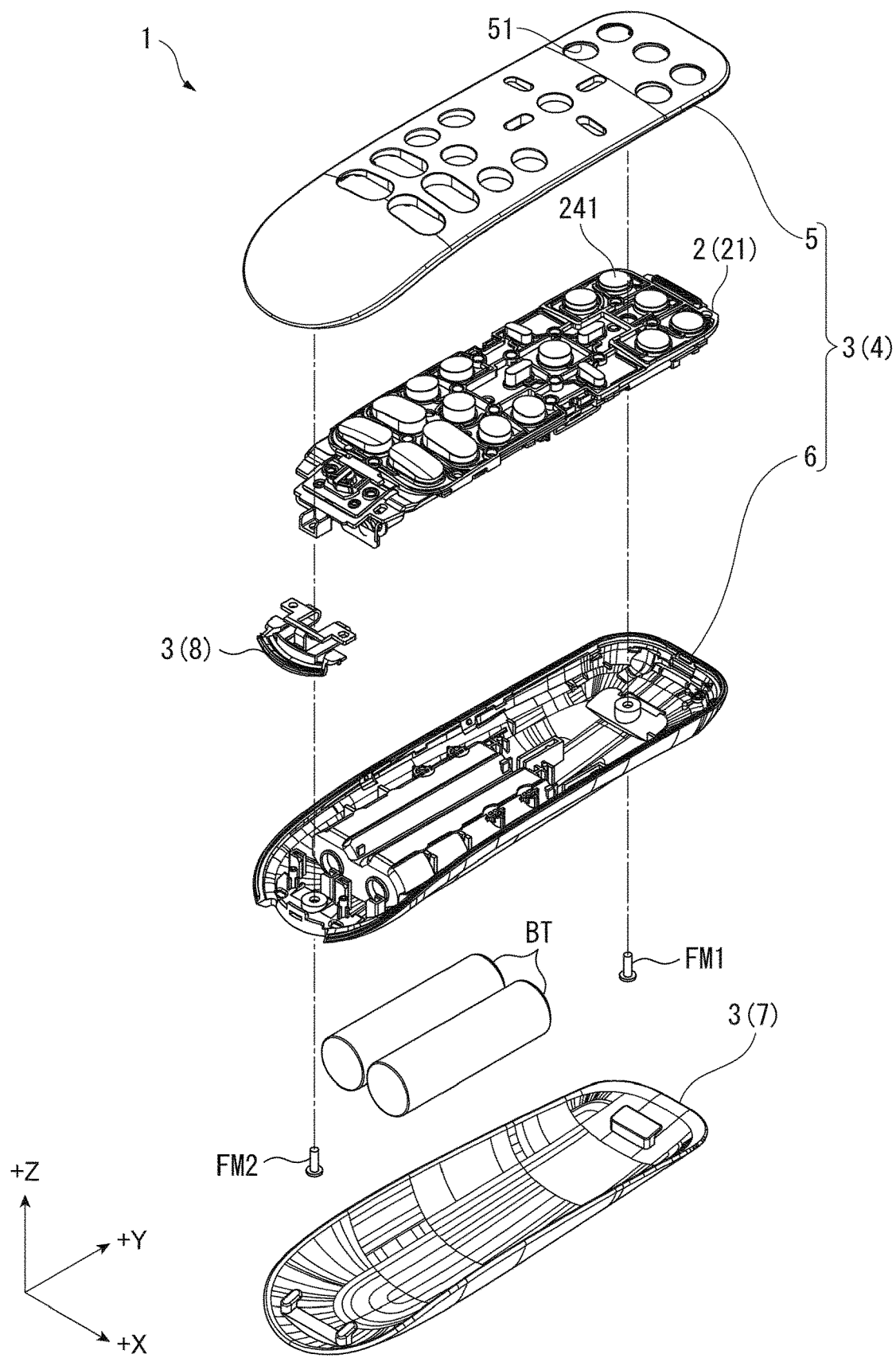
FIG. 3 is an exploded perspective view illustrating the operating device according to an embodiment.
Figure 4:
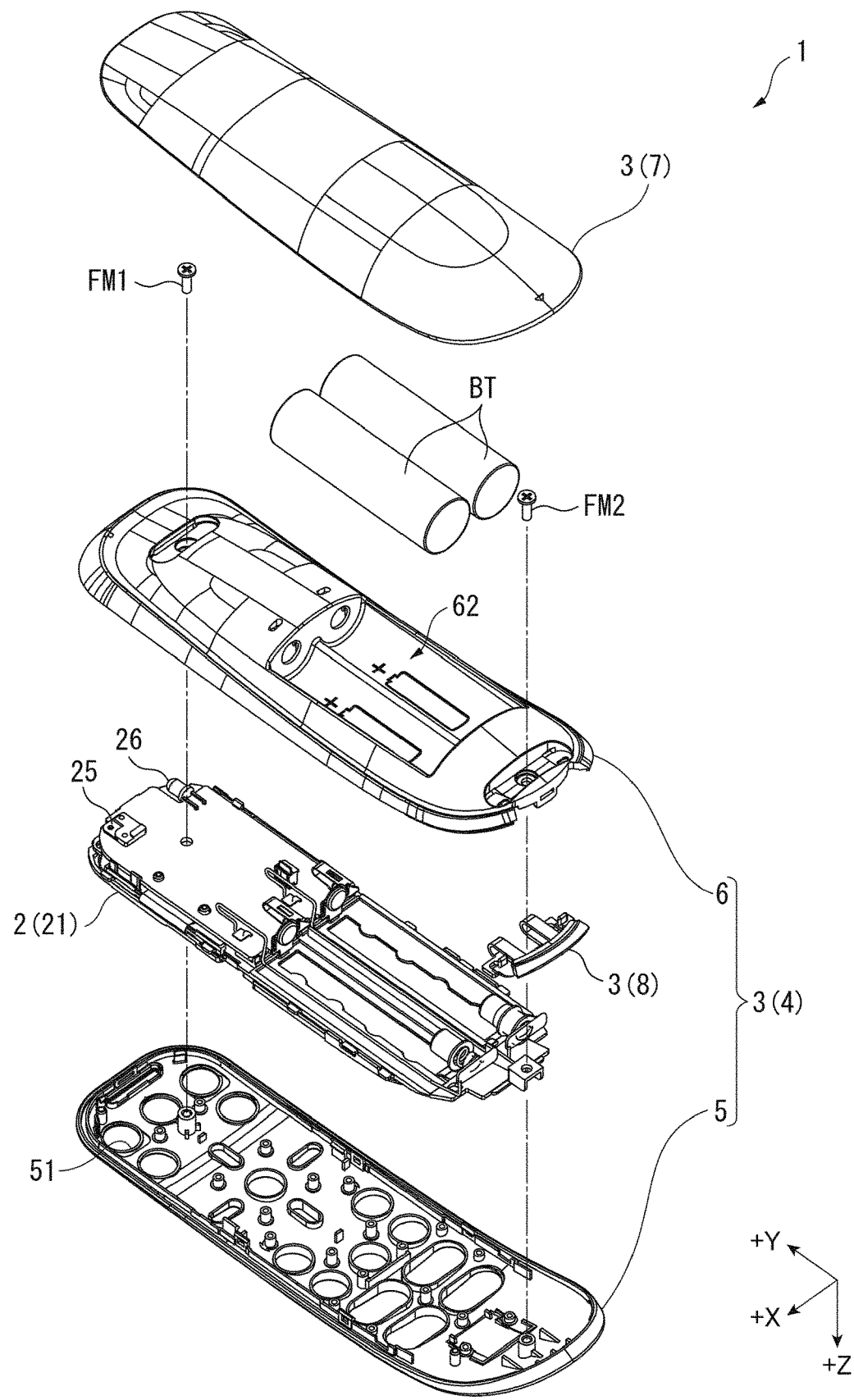
FIG. 4 is an exploded perspective view illustrating the operating device according to an embodiment.

FIGS. 1 to 4 are perspective views illustrating an operating device 1 according to the present embodiment. To be specific, FIG. 1 is a perspective view of the operating device 1 as viewed from a front side. FIG. 2 is a perspective view of the operating device 1 as viewed from a rear side. FIG. 3 is an exploded perspective view of the operating device 1 as viewed from the front side. FIG. 4 is an exploded perspective view of the operating device 1 as viewed from the rear side. Incidentally, in the drawings after FIG. 1, for a plurality of buttons 241 and a plurality of openings 51, only one button 241 and one opening 51 are designated with reference numerals in consideration of legibility.

The operating device 1 according to the present embodiment is a remote control device capable of operating an external device to be operated. To be specific, the operating device 1 transmits an operating signal corresponding to a user's operation on the operating device 1 to an external device by infrared rays or radio waves. Note that the external device includes a television, and an information processing device such as a game device and a PC (Personal Computer), for example. As illustrated in FIGS. 1 to 4, the operating device 1 includes a device main body 2 (FIGS. 3 and 4), a housing 3 (FIGS. 1 to 4), and batteries BT (FIGS. 3 and 4).

In the present embodiment, the battery BT is a generally-called size AA battery, and a plurality of, specifically, two batteries BT are adopted in the operating device 1. Incidentally, the battery BT may be a primary battery or a secondary battery, and the number, a size, and a shape can be appropriately changed without limiting to the size AA battery.

[Configuration of Device Main Body]

Figure 5:
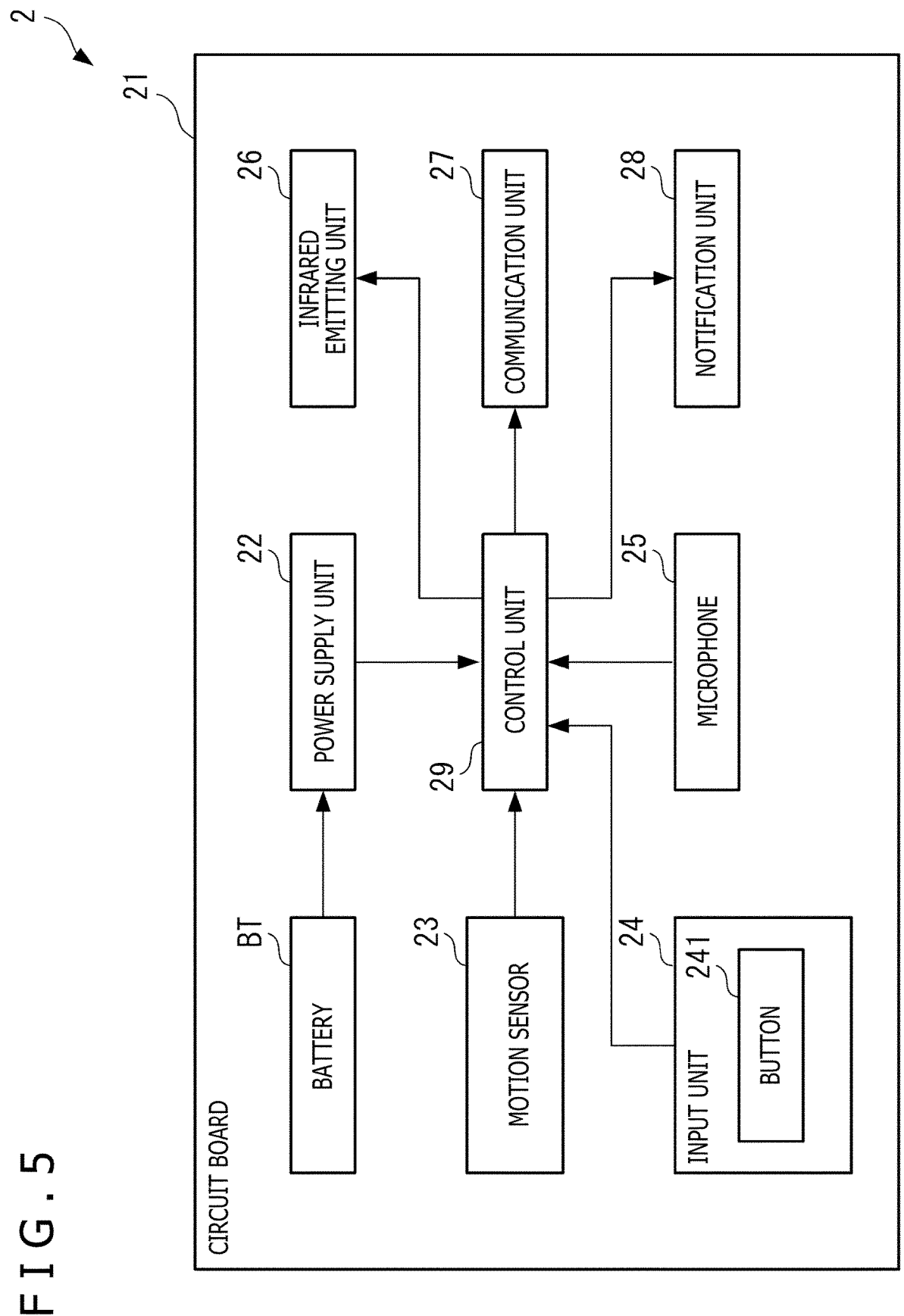
FIG. 5 is a block diagram illustrating a configuration of a device main body according to an embodiment.

FIG. 5 is a block diagram illustrating the configuration of the device main body 2.

The device main body 2 fulfills a function as a remote control device and includes a circuit board 21 on which circuit elements are mounted as illustrated in FIGS. 3 and 4, for example. As illustrated in FIG. 5, the device main body 2 has a power supply unit 22, a motion sensor 23, an input unit 24, a microphone 25, an infrared emitting unit 26, a communication unit 27, a notification unit 28, and a control unit 29, which are mounted on the circuit board 21.

The power supply unit 22 boosts or lowers a voltage of power supplied from the batteries BT installed in an installation portion 62 which will be described later, according to the electronic components constituting the operating device 1. The power supply unit 22 supplies power whose voltage is boosted or lowered to the corresponding electronic components.

The motion sensor 23 detects the movement of the operating device 1. To be more specific, the motion sensor 23 has an acceleration sensor and a gyro sensor and detects the acceleration and the angular velocity acting on the operating device 1 as the movement of the operating device 1. The motion sensor 23 outputs a detection signal indicating the detected movement of the operating device 1 to the control unit 29.

The input unit 24 has the plurality of buttons 241 exposed to the outside of the housing 3. The input unit 24 outputs an input signal, corresponding to the button pressed by the user among the plurality of buttons 241, to the control unit 29. In the present embodiment, at least one button 241 of the plurality of buttons 241 is a button for operating the first operation target among the operation targets of the operating device 1, and the other buttons 241 are buttons for operating the second operation target among the operation targets of the operating device 1.

The microphone 25 detects a voice outside the operating device 1. For example, the microphone 25 detects the voice of the user who operates the operating device 1. The microphone 25 outputs a voice signal corresponding to the detected voice to the control unit 29. In the present embodiment, as illustrated in FIG. 4, the microphone 25 is provided at one end of the end portion of the circuit board 21 on the upper surface portion 3C side, which will be described later. However, a position of the microphone 25 is not limited to this and can be changed as appropriate.

The infrared emitting unit 26 illustrated in FIG. 5 outputs an infrared signal corresponding to an operation signal input from the control unit 29. In other words, the infrared emitting unit 26 emits an operation signal by using infrared rays. In the present embodiment, as illustrated in FIG. 4, the infrared emitting unit 26 is provided at the other end of the end portion of the circuit board 21 on the upper surface portion 3C side, which will be described later. However, the position of the infrared emitting unit 26 is not limited to this and can be changed as appropriate.

The communication unit 27 illustrated in FIG. 5 transmits a wireless signal corresponding to the operation signal input from the control unit 29. In other words, the communication unit 27 wirelessly transmits the operation signal. For example, the communication unit 27 transmits an operation signal in a format corresponding to a short-range wireless communication standard such as Bluetooth (registered trademark).

Note that the communication unit 27 may be able to communicate with a device such as a server via a network such as the Internet.

The notification unit 28 makes a notification regarding an operating state of the operating device 1 on the basis of the notification signal input from the control unit 29. For example, the notification unit 28 makes a notification that the power of the operating device 1 is turned on, based on the notification signal. The notification unit 28 has a solid-state light source such as an LED (Light Emitting Diode) and can be made up by using an indicator that lights up in a color corresponding to an input notification signal.

The control unit 29 includes a circuit element such as an IC (Integrated Circuit) and controls the operation of the operating device 1.

For example, the control unit 29 activates the operating device 1 in response to the detection signal input from the motion sensor 23. The control unit 29 may activate the operating device 1 in the case where a detection signal corresponding to the movement of the operating device 1 when the operating device 1 is lifted up is input from the motion sensor 23.

For example, the control unit 29 causes the infrared emitting unit 26 or the communication unit 27 to transmit an operation signal corresponding to the input signal input from the input unit 24. Note that the control unit 29 chooses between the infrared emitting unit 26 and the communication unit 27 as a transmission unit for operation signals according to the type of the input signal input from the input unit 24, and causes the selected transmission unit to transmit the operation signal. For example, the type of the input signal can be the type of the operation target operated by the operation signal. To be specific, in the case where an input signal corresponding to the input of a button for operating the first operation target such as a television is input to the control unit 29, the control unit 29 causes to the infrared emitting unit 26 to transmit an operation signal corresponding to the input signal. Further, in the case where an input signal corresponding to the input of the button for operating the second operation target such as the information processing device is input to the control unit 29, the control unit 29 causes the communication unit 27 to transmit the operation signal corresponding to the input signal. For example, the control unit 29 outputs a notification signal indicating the operating state of the operating device 1 to the notification unit 28.

[Structure of Housing]

The housing 3 houses the device main body 2 inside. As illustrated in FIGS. 1 and 2, the housing 3 is formed in a substantially rectangular parallelepiped shape elongated in one direction. The size of the housing 3 is determined such that the housing 3 can be gripped by one hand of the user, for example.

The housing 3 has a front portion 3A, a back portion 3B, an upper surface portion 3C, a lower surface portion 3D, a left side surface portion 3E, and a right side surface portion 3F. The front portion 3A and the back portion 3B are located on opposite sides of each other. The upper surface portion 3C and the lower surface portion 3D are located on opposite sides of each other, and the left side surface portion 3E and the right side surface portion 3F are located on opposite sides of each other. The housing 3 includes a housing body 4, a lid member 7, and a locking member 8, and the outer shape of the housing 3 is formed by mounting the lid member 7 on the housing body 4.

In the following description, the three directions perpendicular to each other are a +X direction, a +Y direction, and a +Z direction. Of these directions, the +X direction is the direction from the left side surface portion 3E to the right side surface portion 3F, the +Y direction is the direction from the lower surface portion 3D to the upper surface portion 3C, and the +Z direction is the direction from the back portion 3B to the front portion 3A. Further although not illustrated, the opposite direction of the +X direction is a −X direction, the opposite direction of the +Y direction is a −Y direction, and the opposite direction of the +Z direction is a −Z direction.

In the present embodiment, the +Y direction corresponds to the first direction and is an upward direction in the operating device 1. The −Y direction corresponds to the direction opposite to the first direction, and is the downward direction in the operating device 1. The +Z direction is a direction that intersects with the first direction, and corresponds to a direction in which an operating portion 84, which will be described later, is inserted into the housing body 4. The +Z direction is the direction toward the front side in the operating device 1 and the −Z direction is the direction toward the rear side in the operating device 1. Further, the +X direction is the rightward direction with respect to the operating device 1, and the −X direction is the leftward direction with respect to the operating device 1.

[Structure of Housing Body]

The housing body 4 has an elongate shape in the +Y direction. The housing body 4 has a first member 5 located in the +Z direction thereof and a second member 6 located in the −Z direction thereof, and the first member 5 and the second member 6 are combined with each other.

[Structure of First Member]

Figure 6:
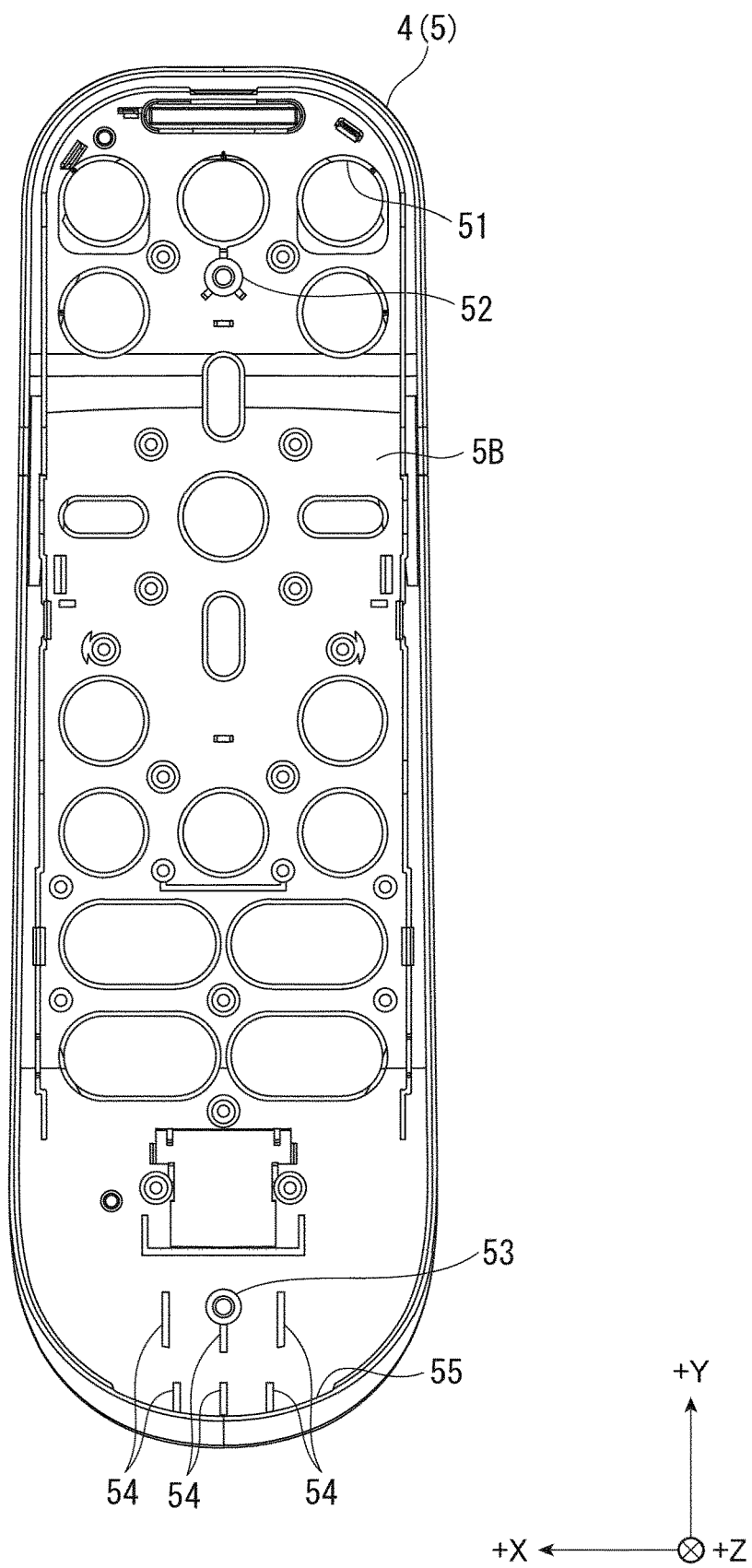
FIG. 6 is a plan view of a first member according to an embodiment as viewed from a rear side.

FIG. 6 is a plan view of the first member 5 as viewed from the rear side. In other words, FIG. 6 is a plan view of the end portion in the −Y direction of the first member 5 as viewed from the −Z direction.

The first member 5 constitutes at least the front portion 3A of the housing 3. As illustrated in FIG. 6, the first member 5 has the plurality of openings 51 that expose the plurality of buttons 241 to the front outside of the housing 3. That is, the plurality of buttons 241 are provided on the front portion 3A.

The first member 5 has fixing portions 52 and 53, supports 54, and a cutout 55 on a back surface 5B, which is a surface in the −Z direction of the first member 5. The back surface 5B is a surface facing the circuit board 21 and the second member 6 in the −Z direction, and is an inner surface in the +Z direction of the housing body 4. The fixing portion 52 is provided at a region in the +Y direction on the back surface 5B. The fixing portion 53 is provided at a region in the −Y direction on the back surface 5B. Fixing members FM1 and FM2 which have passed through the circuit board 21 and the second member 6 are fixed to the fixing portions 52 and 53. That is, the fixing members FM1 and FM2 fix the circuit board 21 and the second member 6 to the fixing portions 52 and 53 of the first member 5. In the present embodiment, as illustrated in FIGS. 3 and 4, screws for passing through the second member 6 and the circuit board 21 are adopted as the fixing members FM1 and FM2.

The supports 54 support the locking member 8. In the present embodiment, the supports 54 are composed of a plurality of ribs erected on the back surface 5B.

The cutout 55 is a portion located at the end in the −Y direction on the back surface 5B, and is a portion cut out to be recessed in the +Y direction. The operating portion 84, which will be described later, of the locking member 8 is arranged in the cutout 55.

[Structure of Second Member]

Figure 7:
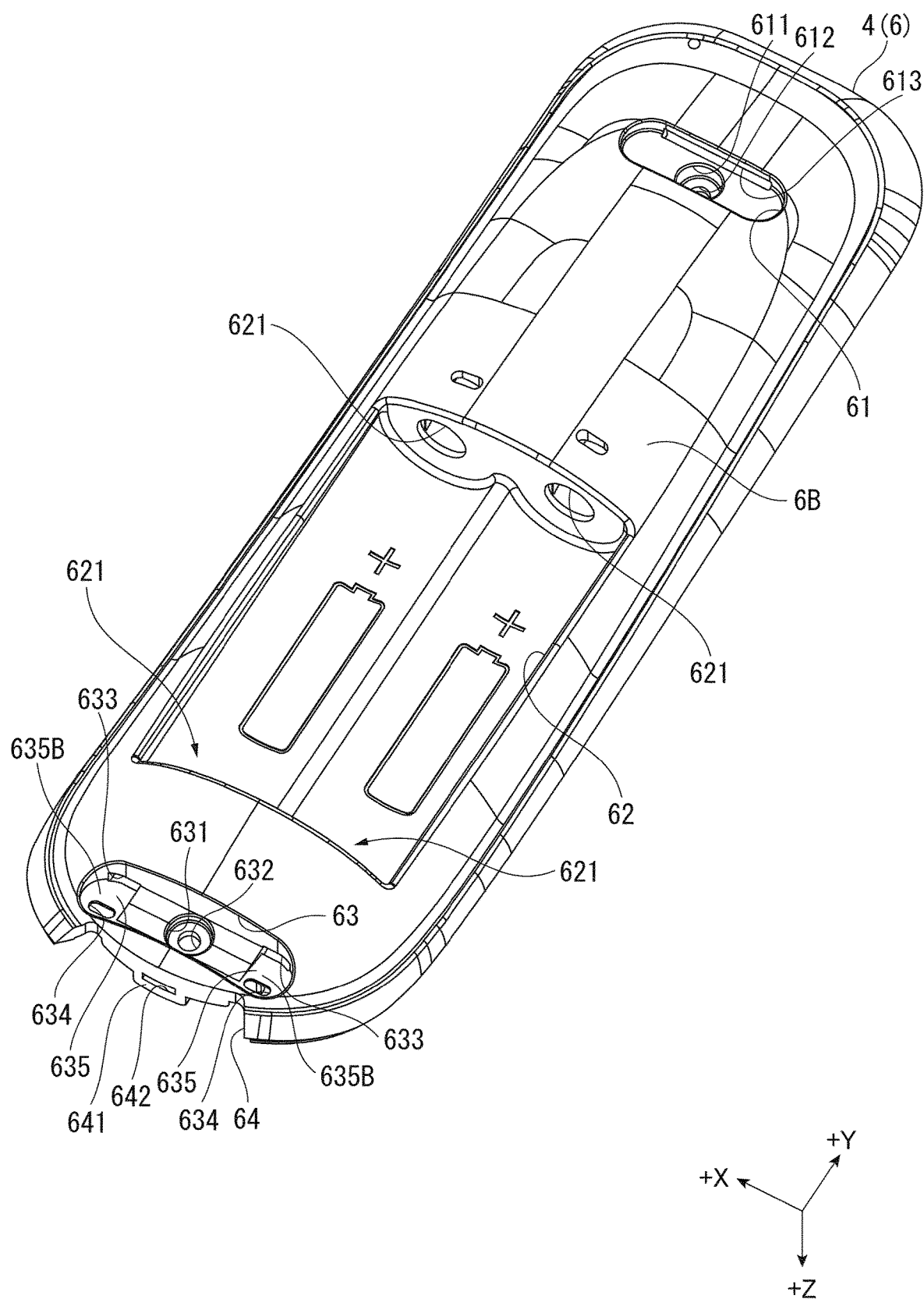
FIG. 7 is a perspective view of a second member according to an embodiment as viewed from the rear side.

FIG. 7 is a perspective view of the second member 6 as viewed from the −Z direction, namely from the rear side. The second member 6 constitutes the back surface of the housing body 4, and also constitutes a part of each of the upper surface portion 3C, the lower surface portion 3D, the left side surface portion 3E, and the right side surface portion 3F of the housing 3.

As illustrated in FIG. 7, the second member 6 has a curved shape in which the center in the +X direction and the +Y direction bulges in the −Z direction. The second member 6 has a recess 61, the installation portion 62, a recess 63, and a cutout 64.

The recess 61 is located in the +Y direction on a back surface 6B, which is the surface in the −Z direction of the second member 6, and is recessed toward the +Z direction. A step portion 611, through hole 612, and slit 613 are provided in the recess 61.

The step portion 611 is recessed toward the +Z direction at the center in the +X direction of the bottom of the recess 61.

The through hole 612 is located substantially in the center of the step portion 611 and penetrates the second member 6 in the +Z direction. A part of the fixing member FM1 is inserted into the through hole 612. To be specific, a shaft of the fixing member FM1 which is a screw is inserted into the through hole 612. The shaft of the fixing member FM1 is fixed to the fixing portion 52 (see FIG. 6), and the head of the fixing member FM1 is placed in the step portion 611.

The slit 613 is provided on the part in the +Y direction of the inner surface of the recess 61. The slit 613 is formed in a rectangular shape elongated in the +X direction. When the lid member 7 is attached to the housing body 4, a protrusion 712 of a hook portion 71 to be described later of the lid member 7 is inserted into the slit 613.

The installation portion 62 is located substantially in the center of the back surface 6B and is a portion recessed in the +Z direction. Two batteries BT are installed in the installation portion 62. The installation portion 62 has two openings 621 located on the inner surface in the +Y direction and two openings 621 located on the inner surface in the −Y direction. That is, the installation portion 62 has four openings 621.

Although not illustrated in FIG. 7, each of the four electrodes of the power supply unit 22 is inserted into the installation portion 62 through the corresponding opening 621 of the four openings 621. As a result, these electrodes and the electrodes of the two batteries BT can come into contact with each other, respectively.

The recess 63 is a portion where the locking member 8 is arranged and is a portion through which a fixing member FM2 is inserted. In the recess 63, a step portion 631, a through hole 632, two slits 633, two openings 634, and two guide portions 635 are provided.

The step portion 631 is recessed in the +Z direction at the center of the bottom of the recess 63 in the +X direction.

The through hole 632 is located substantially in the center of the step portion 631 and penetrates the second member 6 in the +Z direction. Similarly to the fixing member FM1, the shaft of the fixing member FM2, which is a screw, is inserted through the circuit board 21 after passing through the through hole 632 and fixed to the fixing portion 53 (see FIG. 6). The head of the fixing member FM2 is arranged in the step portion 631.

The two slits 633 are provided on a part of the inner surface located in the +Y direction of the recess 61. Of the two slits 633, one slit 633 is located in the +X direction, and the other slit 633 is located in the −X direction. When the lid member 7 is attached to the housing body 4, a hook portion 73 to be described later of the lid member 7 is inserted into each of the two slits 613. That is, each slit 633 is a hole into which the protrusion 732 of the hook portion 73 is inserted.

The two openings 634 are provided at positions so that the step portion 631 is sandwiched between the two openings 634 in the +X direction. To be specific, the opening 634 located in the +X direction of the two openings 634 is positioned in the −Y direction with respect to the slit 633 located in the +X direction of the two slits 633. The opening 634 located in the −X direction of the two openings 634 is positioned in the −Y direction with respect to the slit 633 located in the −X direction of the two slits 633. Two regulating portions 853 to be described later of the locking member 8 are exposed on the back surface side of the housing body 4 via the two openings 634.

The two guide portions 635 are provided at positions so that the step portion 631 is sandwiched between the two guide portions 635 in the +X direction. To be more specific, of the two guide portions 635, the guide portion 635 in the +X direction is located between the slit 633 in the +X direction and the opening 634 in the +X direction, and the guide portion 635 in the −X direction is located between the slit 633 in the −X direction and the opening 634 in the −X direction.

The surface in the −Z direction of each guide portion 635 is a guide surface 635B inclined toward the +Z direction so that the lid member 7 becomes closer to the housing body 4 as the lid member 7 moves toward the +Y direction. When the lid member 7 slides in the +Y direction, the hook portion 73 to be described later of the lid member 7 slides along the guide surface 635B.

The cutout 64 is a portion of the second member 6 that is recessed in the +Y direction as if the end portion in the −Y direction is cut off. The operating portion 84, which will be described later, of the locking member 8 is arranged in the cutout 64.

The cutout 64 has a protrusion 641 protruding in the +Z direction on the surface located in the +Y direction thereof.

A substantially rectangular slit 642 elongated in the +X direction is formed on the protrusion 641.

When the locking member 8 is attached to the second member 6, an insertion portion 815 to be described later of the locking member 8 is inserted into the slit 642 from the +Y direction.

Figure 8:
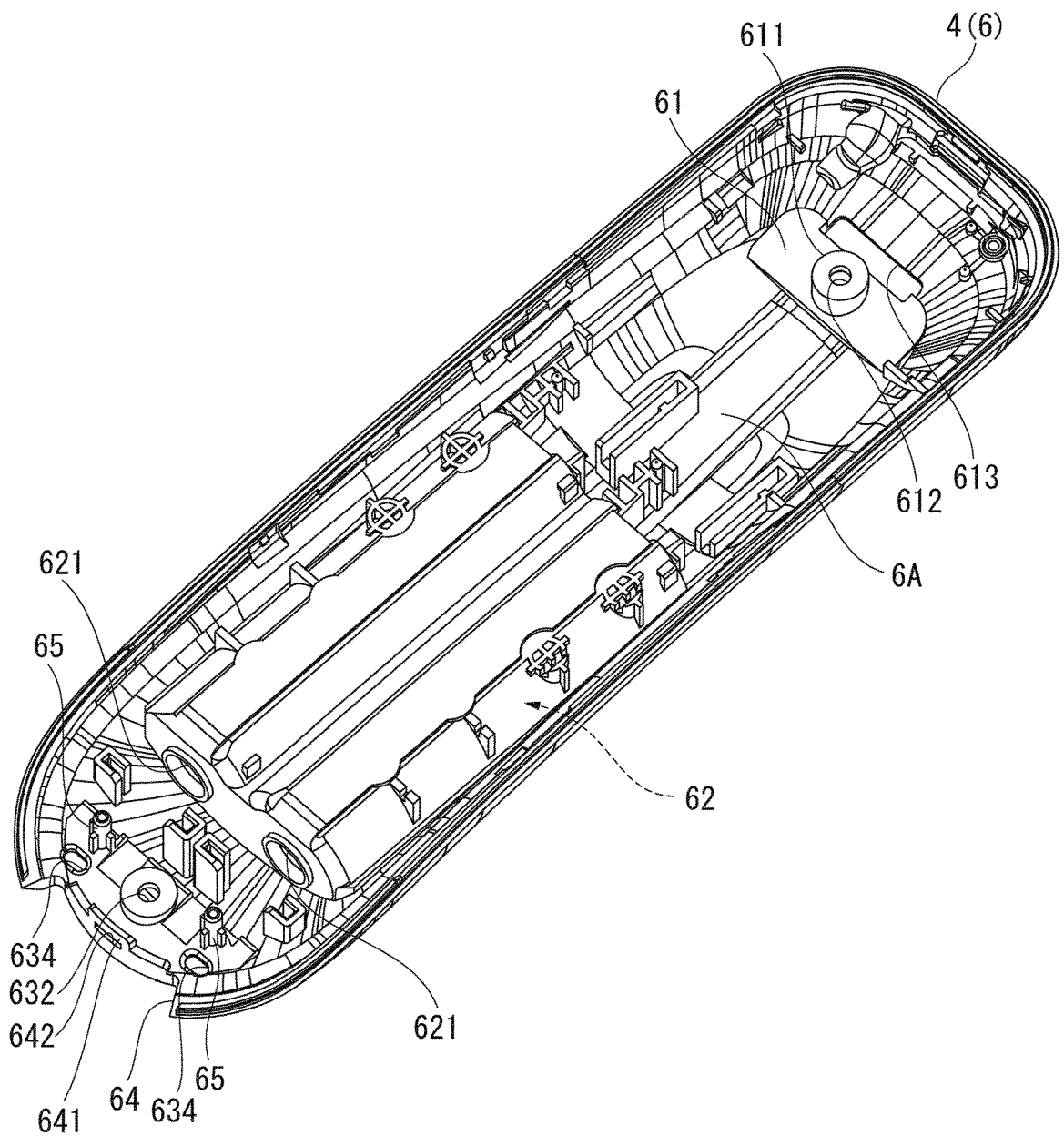
FIG. 8 is a perspective view of the second member according to an embodiment as viewed from a front side.

FIG. 8 is a perspective view of the second member 6 as viewed from the +Z direction, namely from the front side. In addition to the above configuration, the second member 6 has two pins 65 projecting from an inner surface 6A, which is a surface located in the +Z direction of the second member 6, as illustrated in FIG. 8. Note that the inner surface 6A is a surface facing the circuit board 21 and the first member 5 in the +Z direction, and is an inner surface located in the −Z direction of the housing body 4.

The two pins 65 are provided at positions so that the through hole 632 is sandwiched between the two pins 65 in the +X direction. Each of the two pins 65 is inserted into a corresponding positioning hole 812 of two positioning holes 812 to be described later of the locking member 8. That is, the two pins 65 are inserted into the two positioning holes 812, and the insertion portion 815 is inserted into the slit 642, so that the locking member 8 is temporarily fixed to the second member 6.

[Structure of Lid Member]

Figure 9:
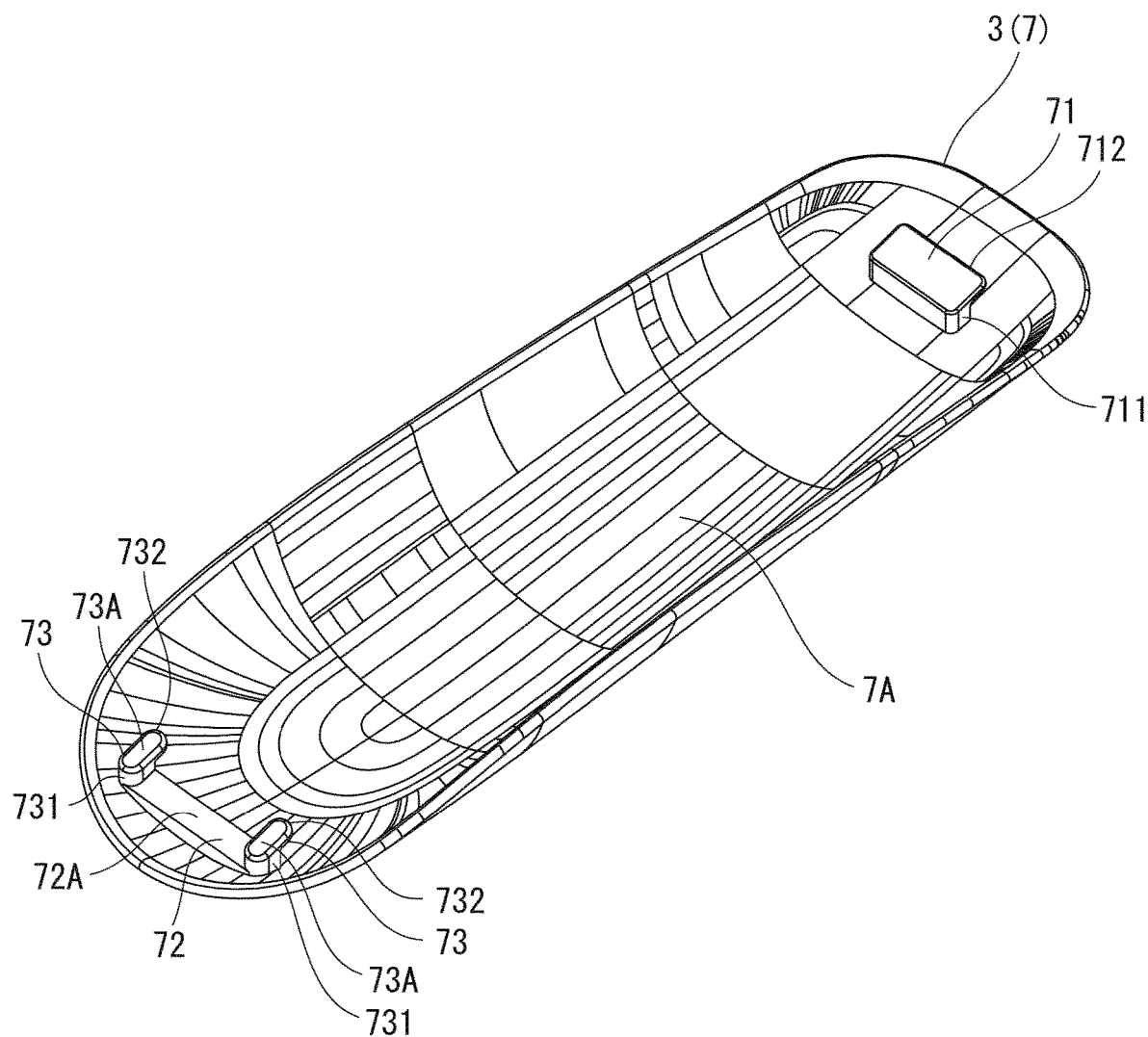
FIG. 9 is a perspective view of a lid member according to an embodiment as viewed from the front side.

FIG. 9 is a perspective view of the lid member 7 as viewed from the +Z direction, namely from the front side. The lid member 7 is attached to the second member 6 of the housing body 4, so as to form the back portion 3B and a part of each of the upper surface portion 3C, the lower surface portion 3D, the left side surface portion 3E, and the right side surface portion 3F of the housing 3. By being attached to the second member 6, the lid member 7 can be a battery lid that covers the installation portion 62, that is, covers the two batteries BT installed in the installation portion 62 as well.

As illustrated in FIG. 9, the lid member 7 has a curved shape corresponding to the shape of the back surface 6B of the second member 6. The lid member 7 has the hook portion 71, a flat portion 72, and two hook portions 73 on an inner surface 7A which is a surface in the +Z direction of the lid member 7.

The hook portion 71 is provided in a region located in the +Y direction on the inner surface 7A. The hook portion 71 has an upright portion 711 that is erected from the inner surface 7A in the +Z direction, and the protrusion 712 that protrudes in the +Y direction from the tip of the upright portion 711.

The protrusion 712 is inserted into the slit 613 (see FIG. 7) when the lid member 7 is attached to the second member 6. At this time, the hook portion 71 is arranged in the recess 61.

The flat portion 72 is provided in a region located in the −Y direction of the inner surface 7A. A surface 72A located in the +Z direction of the flat portion 72 is a flat surface substantially parallel to the XY plane.

The two hook portions 73 are provided on the surface 72A. More specifically, of the two hook portions 73, one hook portion 73 is provided at the end in the +X direction on the surface 72A, and the other hook portion 73 is provided at the end in the −X direction on the surface 72A.

Each of the two hook portions 73 has an upright portion 731 that is erected in the +Z direction from the surface 72A and a protrusion 732 that protrudes in the +Y direction from the tip of the upright portion 731, similarly to the hook portion 71.

The protrusion 732 is inserted into the slit 633 (see FIG. 7) of the second member 6 when the lid member 7 is attached to the housing body 4. At this time, a part of the flat portion 72 and the hook portion 73 are arranged in the recess 63.

In the hook portion 73, the end surface formed by the surface in the +Z direction of the protrusion 732 is an inclined surface 73A extending in the +Y direction while leaning toward the +Z direction. The inclined surface 73A comes into contact with the guide surface 635B when the lid member 7 is attached to the housing body 4.

Note that the flat portion 72 adjusts a height of each protrusion 732 from the inner surface 7A to a height of the protrusion 712 from the inner surface 7A. However, the two hook portions 73 may be erected directly from the inner surface 7A. In this case, the flat portion 72 can be omitted.

[Structure of Locking Member]

Figure 10:
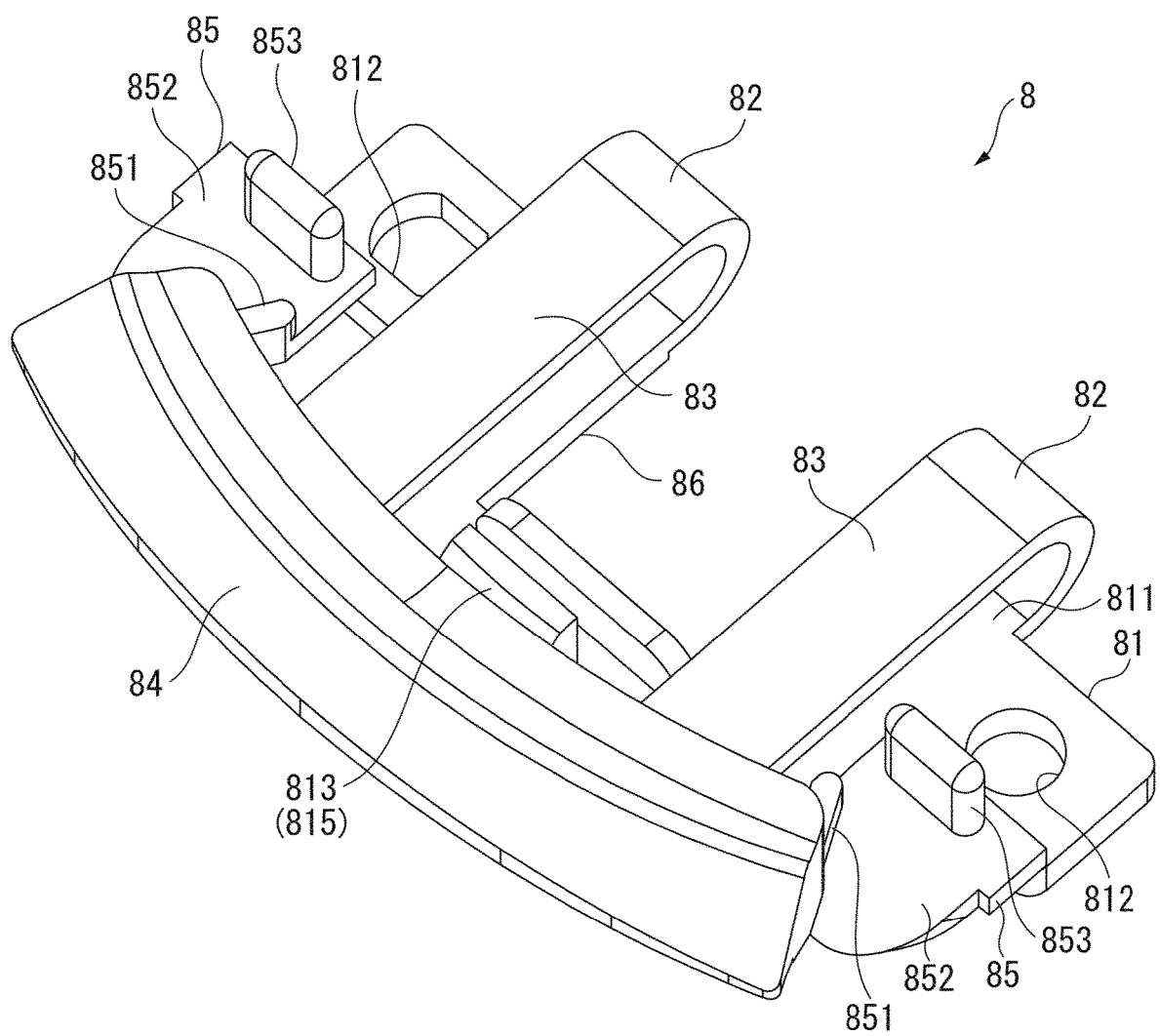
FIG. 10 is a perspective view illustrating a locking member according to an embodiment.
Figure 10:
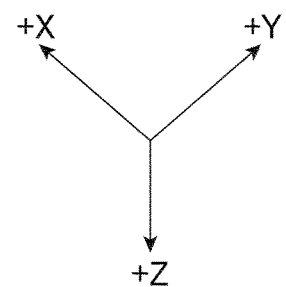
Figure 11:
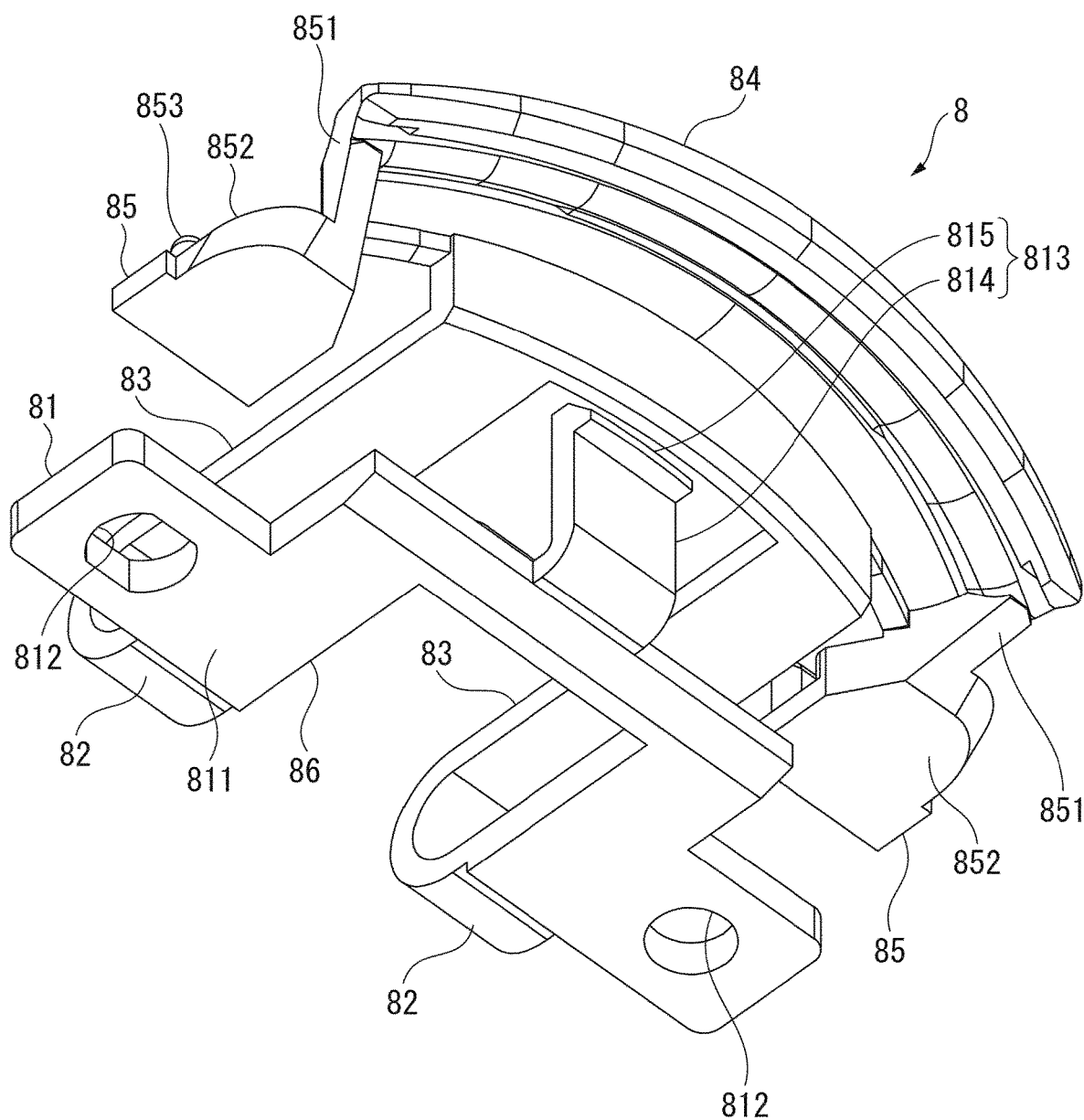
FIG. 11 is a perspective view illustrating the locking member according to an embodiment.
Figure 12:
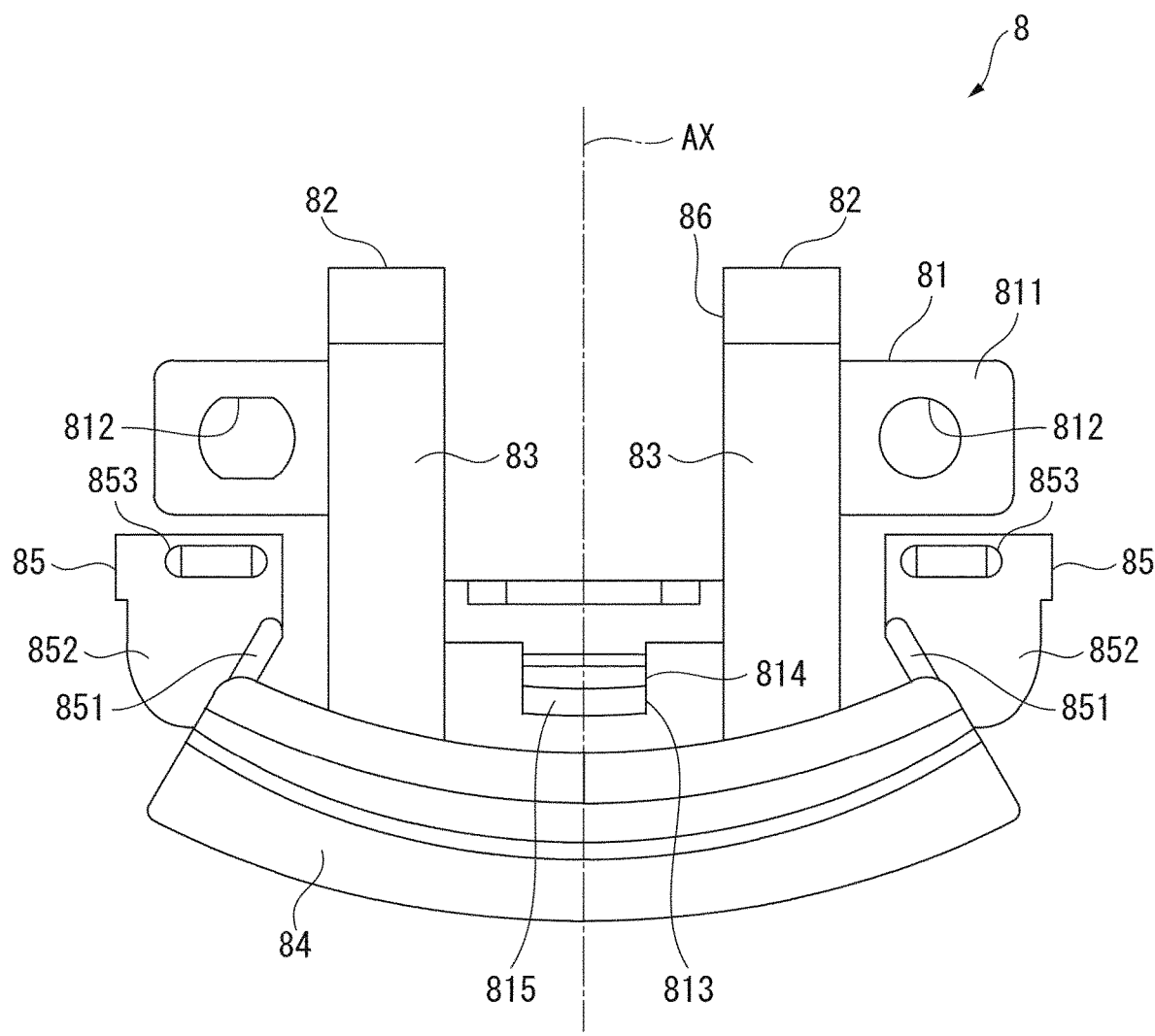
FIG. 12 is a plan view illustrating the locking member according to an embodiment.
Figure 12:
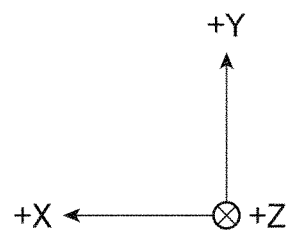

FIGS. 10 and 11 are perspective views illustrating the locking member 8. To be specific, FIG. 10 is a perspective view of the locking member 8 as viewed from below, that is, from the back surface side, and FIG. 11 is a perspective view of the locking member 8 as viewed from above, that is, from the front surface side. FIG. 12 is a plan view of the locking member 8 as viewed from the −Z direction.

The locking member 8 is provided on the housing 3 and locks the lid member 7. Specifically, the locking member 8 is provided at the end of the housing body 4 in the −Y direction and locks the lid member 7 mounted on the housing body 4. As illustrated in FIGS. 10 to 12, the locking member 8 has a mounting portion 81, two hinge portions 82, two connecting portions 83, the operating portion 84, two step portions 85, and an opening 86.

The mounting portion 81 is a portion to be mounted on the housing body 4. The mounting portion 81 has a base 811, the two positioning holes 812, and a hook portion 813. The base 811 is formed in a flat plate shape. The base 811 is a portion supported by the supports 54 of the first member 5 and is a portion connected to one end in the +Z direction of each of the two hinge portions 82. Incidentally, the base 811 may be fixed to the first member 5 at the supports 54 by adhesion or the like.

Of the two positioning holes 812, one positioning hole 812 is provided at the +X direction end of the base 811 and the other positioning hole 812 is provided at the −X direction end of the base 811. The corresponding pin 65 of the two pins 65 (see FIG. 8) is inserted into each of the two positioning holes 812. It is to be noted that the positioning hole 812 located in the +X direction of the two positioning holes 812 is formed in an oval shape having a major axis in the +X direction in order to absorb the positional deviation of the pin 65 due to the dimensional tolerance.

The hook portion 813 is provided at the end portion of the base 811 in the −Y direction. The hook portion 813 has an upright portion 814 that is erected in the −Z direction from the base 811 and the insertion portion 815 that protrudes in the −Y direction from the tip of the upright portion 814. The insertion portion 815 is inserted into the slit 642.

The two hinge portions 82 are provided at the ends in the +Y direction of the locking member 8. The two hinge portions 82 are formed in a lateral U-shape that opens toward the −Y direction when viewed from the +X direction. That is, each hinge portion 82 has a curved shape bulging toward the +Y direction.

As described above, the ends of the two hinge portions 82 in the +Z direction are each connected to the base 811 of the mounting portion 81. The end in the −Z direction of each of the two hinge portions 82 is connected to a corresponding connecting portion 83 of the two connecting portions 83.

In the present embodiment, the locking member 8 is made of synthetic resin, and the two hinge portions 82 are flexible so that the ends thereof in the −Z direction connected to the connecting portion 83 are elastically deformable in the −Y direction and the +Z direction. Therefore, each hinge portion 82 urges each connecting portion 83, and thus urges the operating portion 84, in the −Z direction.

The two connecting portions 83 connect the two hinge portions 82 and the operating portion 84. Of the two connecting portions 83, the connecting portion 83 in the +X direction connects the hinge portion 82 in the +X direction of the two hinge portions 82 and the operating portion 84, and the connecting portion 83 in the −X direction connects the hinge portion 82 in the −X direction of the two hinge portions 82 and the operating portion 84.

Note that the surface of each connecting portion 83 in the −Z direction comes into contact with the inner surface 6A of the second member 6 by the urging force of each hinge portion 82 in a state where the operating portion 84 is not pushed down in the +Z direction.

The operating portion 84 is located at the end in the −Y direction of the locking member 8 and is located in the −Z direction with respect to the mounting portion 81. In other words, the mounting portion 81 is located in the +Z direction with respect to the operating portion 84, which is the direction in which the operating portion 84 is inserted into the housing body 4.

The operating portion 84 is connected to the two hinge portions 82 via the two connecting portions 83. The operating portion 84 is formed in a wide arc shape elongated in the +X direction and bulges toward the −Y direction when viewed from the −Z direction. When attached to the housing body 4, the operating portion 84 can be inserted in the +Z direction into the housing body 4 by bending the hinge portions 82, and can protrude from the housing body 4 in the −Z direction due to the urging force of the hinge portions 82.

That is, in a state where the operating portion 84 is not pushed down in the +Z direction, the operating portion 84 is urged in the −Z direction by each hinge portion 82 and is positioned in the cutout 64. As a result, the surface of the operating portion 84 in the −Z direction and the back surface 6B of the second member 6 make a continuous curved surface.

The two step portions 85 are provided in the +X direction and the −X direction with respect to the operating portion 84. The step portion 85 in the +X direction of the two step portions 85 has an extending portion 851 extending in the +Z direction from the end in the +X direction of the operating portion 84 and a protrusion 852 protruding in the +X direction from the tip of the extending portion 851. Similarly, the step portion 85 in the −X direction of the two step portions 85 has an extending portion 851 extending in the +Z direction from the end in the −X direction of the operating portion 84 and a protrusion 852 protruding in the −X direction from the tip of the extending portion 851.

A regulating portion 853, which is a rib projecting in the −Z direction, is provided on the surface in the −Z direction of each protrusion 852.

As illustrated in FIGS. 10 and 12, the regulating portion 853 is located between the hinge portion 82 and the operating portion 84 in the +Y direction. More specifically, the regulating portion 853 is provided at a position closer to the operating portion 84 between the hinge portion 82 and the operating portion 84. Further, as illustrated in FIG. 12, a plurality of regulating portions 853 are provided at positions that are line-symmetrical with respect to the central axis Ax of the locking member 8 extending in the +Y direction when viewed from the −Z direction. That is, the two regulating portions 853 are provided at positions line-symmetrical with respect to the central axis Ax.

Each regulating portion 853 protrudes in the −Z direction with respect to the second member 6 via the corresponding opening 634 of the two openings 634. Each regulating portion 853 restricts the hook portion 73 of the lid member 7 mounted on the housing body 4 from moving in the −Y direction, and eventually restricts the lid member 7 from sliding in the direction in which the lid member 7 is detached from the housing body 4.

Note that, as the operating portion 84 is urged in the −Z direction by the urging force of each hinge portion 82, each regulating portion 853 is also urged in the −Z direction. Therefore, in a state where the operating portion 84 is not pushed down in the +Z direction, a state where the regulating portion 853 can come into contact with the end portion of the hook portion 73 in the −Y direction is maintained.

As illustrated in FIGS. 10 to 12, the opening 86 is formed substantially in the center of the locking member 8 and opens toward the +Z direction, −Z direction, and +Y direction. The opening 86 is an opening 86 for avoiding interference with the fixing portion 53, the step portion 631, and the fixing member FM2. By providing the opening 86, the locking member 8 is formed in a substantially U shape that opens toward the +Y direction when viewed from the −Z direction.

Since the locking member 8 is formed in such a shape, a space for arranging the fixing member FM2 can be provided in the opening 86, so that the size of the housing body 4 can be reduced, and eventually the operating device 1 can be miniaturized.

[Arrangement of Locking Member]

Figure 13:
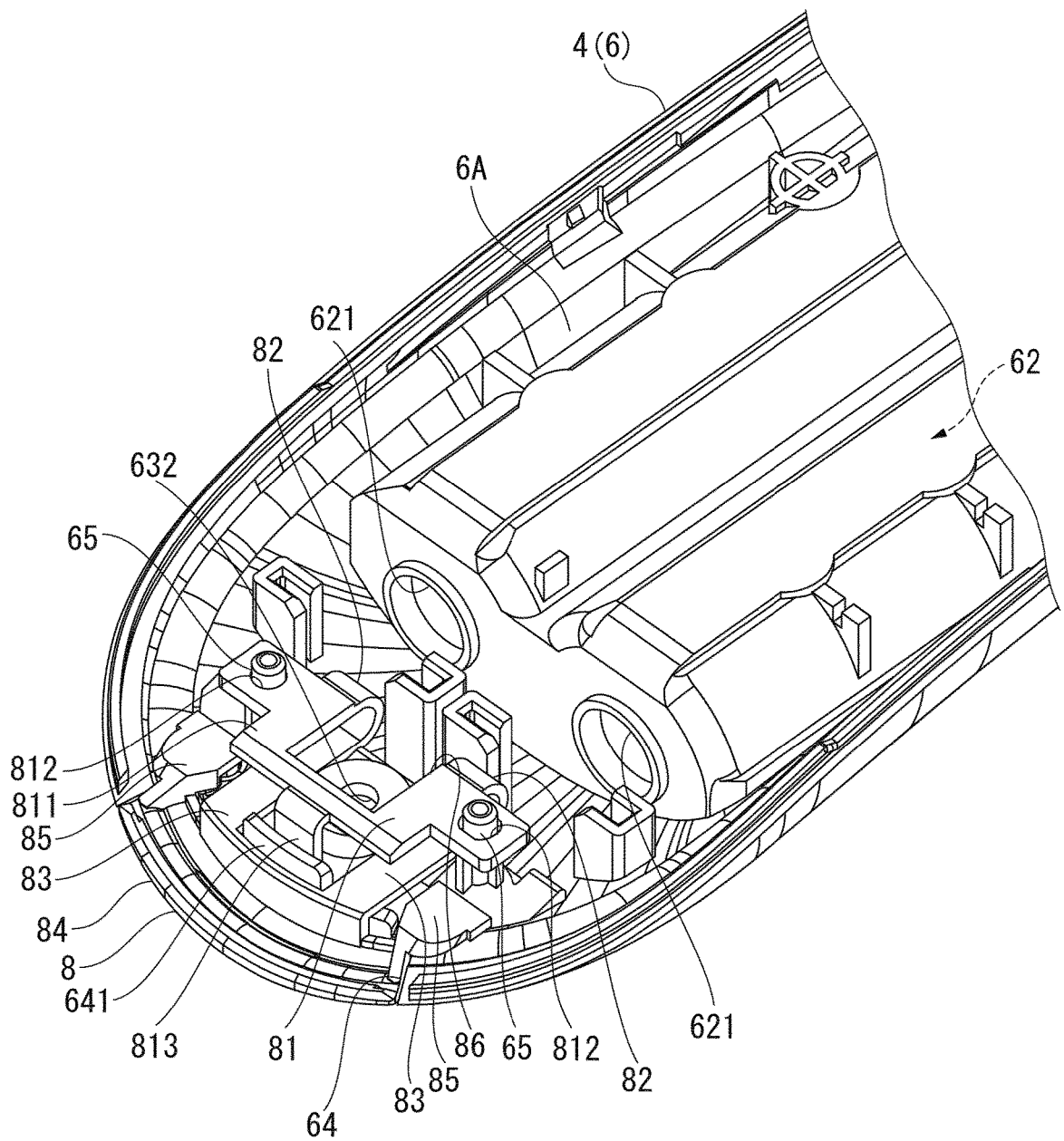
FIG. 13 is a perspective view illustrating a part of the second member and the locking member according to an embodiment.

FIG. 13 is a perspective view illustrating a part of the second member 6 and the locking member 8.

In the case of attaching the locking member 8 to the housing body 4, as illustrated in FIG. 13, the corresponding pin 65 is inserted into each of the two positioning holes 812 from the −Z direction, and the insertion portion 815 is inserted into the slit 642 from the +Y direction. As a result, the locking member 8 is temporarily fixed to the second member 6.

Figure 14:
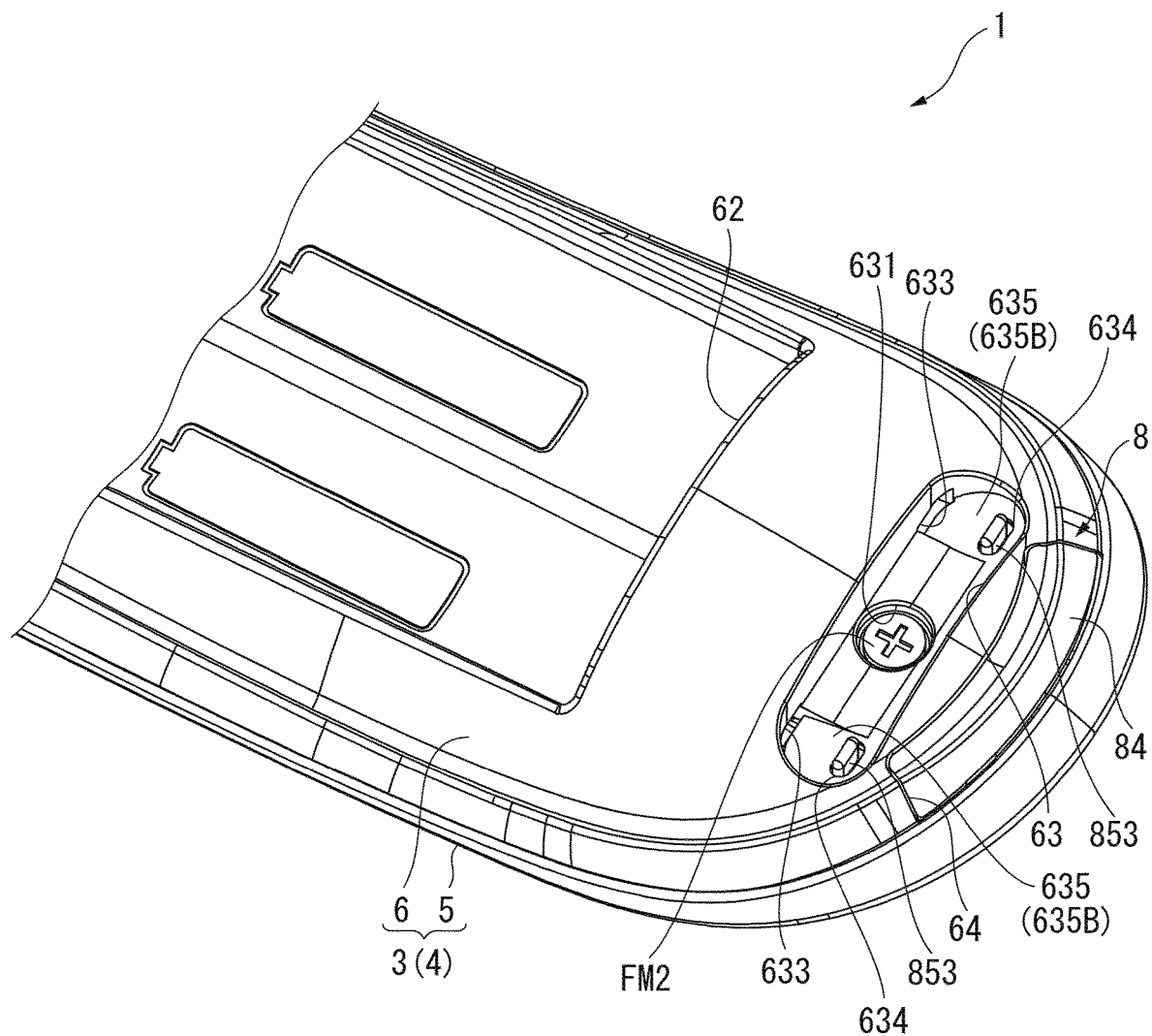
FIG. 14 is a perspective view illustrating a part of a housing body and the locking member according to an embodiment.
Figure 14:
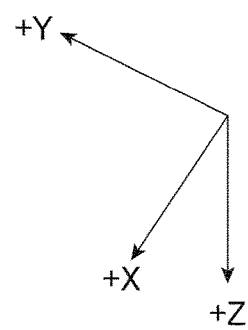

FIG. 14 is a perspective view of a part of the housing body 4 and the locking member 8 as viewed from the −Z direction.

The second member 6 is fixed to the first member 5 by the fixing members FM1 and FM2 in a state where the device main body 2 is sandwiched between the second member 6 to which the locking member 8 is temporarily fixed and the first member 5 in the +Z direction. Due to this, the locking member 8 is supported by the supports 54 (see FIG. 6) of the first member 5, and the locking member 8 is attached to the housing body 4. In this state, as illustrated in FIG. 14, the regulating portion 853 of the locking member 8 comes out in the −Z direction to be exposed with respect to the second member 6 via the opening 634.

[Action of Locking Member]

Figure 15:
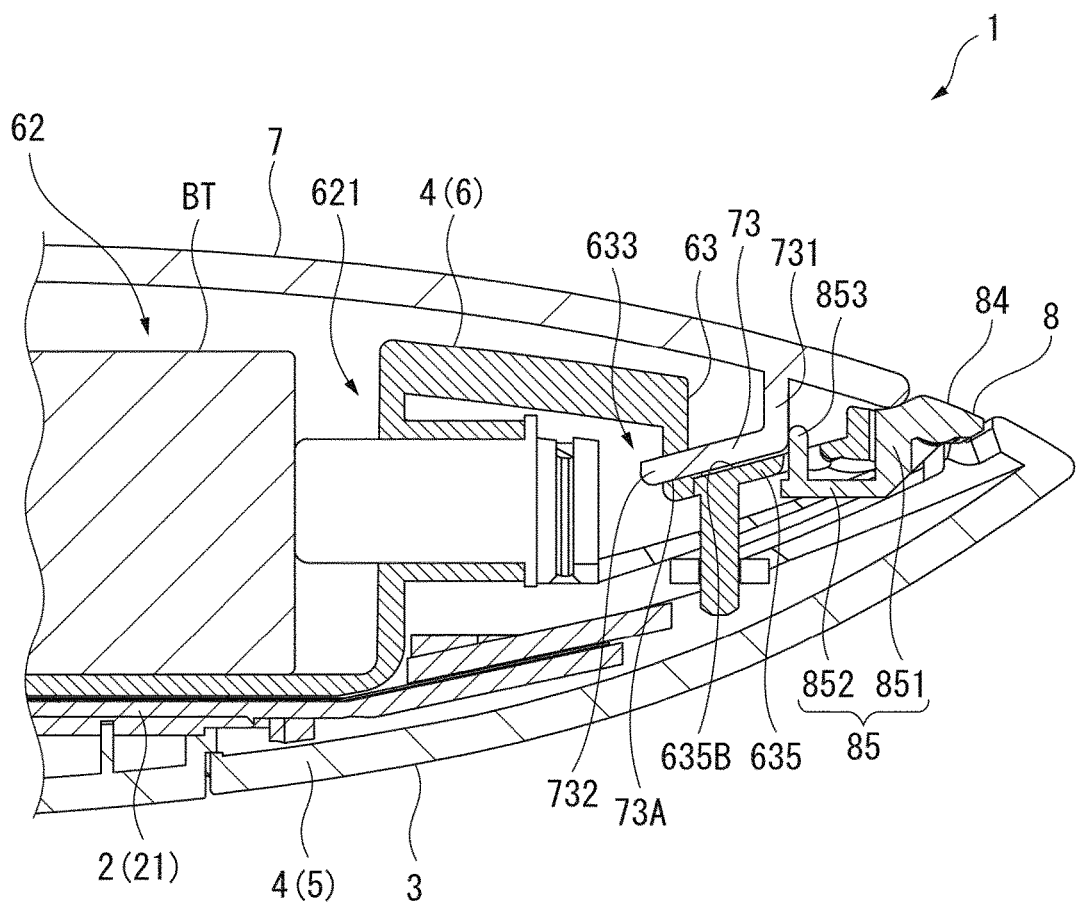
FIG. 15 is a cross-sectional view illustrating the operating device according to an embodiment.
Figure 15:
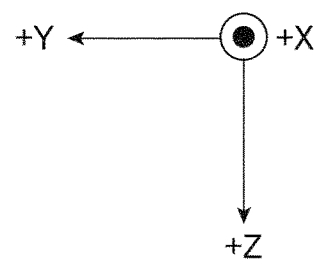

FIG. 15 is a diagram illustrating a cross section of the operating device 1 along the YZ plane. To be specific, FIG. 15 illustrates a cross section of the locking member 8 along the YZ plane passing through the center of the operating device 1 in the +X direction.

In a state where the lid member 7 is attached to the housing body 4, as illustrated in FIG. 15, the protrusion 732 of the hook portion 73 is inserted into the slit 633 located in the recess 63 of the second member 6. In this state, the regulating portion 853 of the locking member 8 protrudes from the opening 634 in the −Z direction so as to be contactable with the end in the −Y direction of the hook portion 73. Therefore, the lid member 7 is restricted from sliding in the −Y direction and is restricted from being detached from the housing body 4.

When the operating portion 84 of the locking member 8 is pressed in the +Z direction by the user, the regulating portion 853 moves in the +Z direction together with the operating portion 84 around the hinge portion 82 and moves in the +Z direction beyond the bottom of the recess 63 on which the opening 634 is formed. That is, the regulating portion 853 is moved to a position so as not to be in contact with the hook portion 73. This enables the lid member 7 to slide in the −Y direction.

When the lid member 7 is slid in the −Y direction, the hook portion 73 is moved in the −Z direction along the guide surface 635B of the guide portion 635 in the recess 63. Therefore, as the lid member 7 is slid in the −Y direction, the lid member 7 is moved in the −Z direction. That is, as the lid member 7 is slid in the −Y direction, the lid member 7 is separated from the housing body 4. Due to this, the lid member 7 can be easily detached from the housing body 4.

It should be noted that, in the case where the lid member 7 is attached to the housing body 4, the lid member 7 is slid in the +Y direction with respect to the housing body 4 with the hook portion 71 arranged in the recess 61 and the hook portion 73 arranged in the recess 63. Due to this, the inclined surface 73A of the hook portion 73 is moved in the +Y direction along the guide surface 635B of the guide portion 635 with which the inclined surface 73A comes in contact, so that the lid member 7 is moved in the +Z direction while being moved in the +Y direction to be in close contact with the housing body 4.

In this state, the protrusion 712 of the hook portion 71 is inserted into the slit 613, and the protrusion 732 of the hook portion 73 is inserted into the slit 633. Then, the regulating portion 853 urged in the −Z direction by the hinge portion 82 is arranged in the −Y direction with respect to the hook portion 73. As a result, the detachment of the lid member 7 from the housing body 4 is restricted. Further, in this state, the operating portion 84 is urged in the −Z direction by the hinge portion 82, and the surface of the operating portion 84 in the −Z direction forms a curved surface continuous with the back surface 6B of the second member 6.

Effect of Embodiment

The operating device 1 according to the present embodiment described above can exert the following effects.

The operating device 1 includes the housing 3. The housing 3 includes the housing body 4, the lid member 7, and the locking member 8. The lid member 7 slides in the +Y direction, which is the first direction, with respect to the housing body 4, to be attached to the housing body 4, and slides in the −Y direction, which is the opposite direction to the first direction, to be detached from the housing body 4. The locking member 8 is provided on the housing body 4 and locks the lid member 7.

The locking member 8 has the mounting portion 81, the hinge portion 82, the operating portion 84, and the regulating portion 853. The mounting portion 81 is mounted on the housing body 4. The hinge portion 82 is connected to the mounting portion 81. The operating portion 84 is connected to the hinge portion 82 and moves around the hinge portion 82. The operating portion 84 can be inserted into and protrudes from the housing body 4. The regulating portion 853 comes in contact with the hook portion 73 of the lid member 7 and restricts the slide of the lid member 7 in the −Y direction. When the operating portion 84 is inserted into the housing body 4, the regulating portion 853 is moved together with the operating portion 84 and separated from the lid member 7.

According to such a structure, in a state where the lid member 7 is attached to the housing body 4, the regulating portion 853 restricts the slide of the lid member 7 in the −Y direction, that is, the slide of the lid member 7 in the direction in which the lid member 7 is detached from the housing body 4. Therefore, the sliding of the lid member 7 in the −Y direction with respect to the housing body 4 is restricted, and the removal of the lid member 7 from the housing body 4 is suppressed.

On the other hand, when the operating portion 84 is inserted into the housing body 4, the regulating portion 853 is moved together with the operating portion 84 around the hinge portion 82 and is separated from the lid member 7. As a result, the lid member 7 is allowed to slide in the −Y direction, and the lid member 7 can be detached from the housing body 4.

In such a way, in a state where the lid member 7 is attached to the housing body 4, the regulating portion 853 regulates the detachment of the lid member 7, and when the operating portion 84 is inserted into the housing body 4, the lid member 7 can be detached from the housing body 4. Therefore, the lid member 7 can be prevented from being unintentionally detached from the housing body 4, and the lid member 7 can be stably mounted on the housing body 4.

In the operating device 1, the housing body 4 has the installation portion 62 into which the battery BT can be installed, and the lid member 7 is a battery lid that covers the installation portion 62.

According to such a configuration, it is possible to prevent the lid member 7 from removing from the housing body 4 and the battery BT installed in the installation portion 62 from coming off.

Here, in the case where the regulating portion 853 is provided on the side opposite to the hinge portion 82 with respect to the operating portion 84, the regulating portion 853 moves significantly due to a slight movement of the operating portion 84 toward the housing body 4. In this case, even a slight movement of the operating portion 84 may cause the lid member 7 to unintentionally come off from the housing body 4.

On the other hand, in the operating device 1, the regulating portion 853 is located between the hinge portion 82 and the operating portion 84 at +Y. According to this, it is possible to suppress the movement of the regulating portion 853 to the extent that the slide restriction of the lid member 7 by the regulating portion 853 is released by a slight movement of the operating portion 84. Therefore, the lid member 7 can be prevented from being unintentionally detached from the housing body 4. In addition, the locking member 8 can be made smaller while increasing the amount of movement of the operating portion 84 which is sufficient to release the slide restriction of the lid member 7 by the regulating portion 853.

In the operating device 1, the operating portion 84 is inserted into the housing body 4 in the +Z direction, which is a direction different from the +Y direction and the −Y direction.

According to such a configuration, the sliding direction of the lid member 7 with respect to the housing body 4 and the insertion direction of the operating portion 84 with respect to the housing body 4 are different, so that the operation of removing the lid member 7 from the housing body 4 can be facilitated.

In the operating device 1, the mounting portion 81 is located in the +Z direction with respect to the operating portion 84, which is the direction in which the operating portion 84 is inserted into the housing body 4.

According to such a configuration, since the operating portion 84 and the mounting portion 81 overlap in the +Z direction, the locking member 8 can be made in a compact size. Therefore, the installation space of the locking member 8 in the housing body 4 can be reduced, and the housing 3 and eventually the operating device 1 can be miniaturized.

In the operating device 1, the lid member 7 has the upright portion 731 that is erected toward the housing body 4 when the lid member 7 is attached to the housing body 4, and the protrusion 732 that protrudes from the upright portion 731 in the +Y direction. The second member 6 of the housing body 4 has the slits 633 which are holes into which the protrusions 732 are inserted when the lid member 7 is attached to the housing body 4. The regulating portion 853 is provided so as to be contactable with the upright portions 731 when the lid member 7 is attached to the housing body 4.

According to such a configuration, the protrusion 732 inserted into the slit 633 comes in contact with the edge of the slit 633, so that the movement of the lid member 7 with respect to the housing body 4 in the +Y direction and movement in directions intersecting with the +Y direction, such as ±X and ±Z directions, are restricted. Further, the regulating portion 853 comes in contact with the upright portion 731 integrally provided with the protrusion 732, thereby restricting the movement of the lid member 7 in the −Y direction with respect to the housing body 4. Therefore, the lid member 7 can be stably mounted on the housing body 4.

In the operating device 1, the two regulating portions 853 are provided at positions that are line-symmetrical with respect to the central axis of the locking member 8 extending in the +Y direction.

According to such a configuration, the detachment of the lid member 7 is regulated by the two regulating portions 853. Therefore, the state in which the lid member 7 is mounted on the housing body 4 can be stably maintained.

In the operating device 1, the operating portion 84 is exposed to the outside of the housing 3.

According to such a configuration, the lid member 7 can be detached from the housing body 4 by inserting the operating portion 84 exposed to the outside of the housing 3 into the housing body 4. Therefore, the operation of removing the lid member 7 from the housing body 4 can be easily performed.

In the operating device 1, the second member 6 of the housing body 4 has the guide portions 635 that guide the slide of the lid member 7 in the ±Y direction. The guide portion 635 has the guide surface 635B inclined toward the +Z direction so that the lid member 7 becomes closer to the housing body 4 as the lid member 7 moves in the +Y direction.

According to such a configuration, in the case where the lid member 7 slides in the +Y direction, the lid member 7 becomes close to the housing body 4. As a result, the lid member 7 can be attached to the housing body 4 in a state where the housing body 4 and the lid member 7 are close to each other. In the case where the lid member 7 slides in the −Y direction, the lid member 7 is separated from the housing body 4. As a result, the lid member 7 can be easily detached from the housing body 4.

In the operating device 1, the locking member 8 is provided at the end of the housing body 4 in the −Y direction.

According to such a configuration, the locking member 8 is provided at the end in the sliding direction of the lid member 7 regulated by the regulating portion 853 in the housing body 4. According to this, when the lid member 7 is detached from the housing body 4, the lid member 7 can be easily slid in the −Y direction.

Therefore, the operation of removing the lid member 7 from the housing body 4 can be facilitated.

Modification of Embodiment

The present invention is not limited to the above embodiment, and modifications, improvements, and the like are included in the present invention to the extent that the object of the present invention can be achieved. In the above embodiment, the lid member 7 is a battery lid that covers, in the +Z direction, the installation portion 62 in which the battery BT is installed. However, not limited to this, the lid member attached to the housing body does not have to be a battery lid. For example, in the case where the operating device is such that an object such as a memory card is installed in the housing body, the lid member may cover the object installed in the housing body.

In the above embodiment, the two regulating portions 853 are located between the hinge portion 82 and the operating portion 84 in the +Y direction, which is the first direction. However, not limited to this, the regulating portion 853 may be located on the side opposite to the hinge portion 82 with respect to the operating portion 84 in the +Y direction, and may be located on the side opposite to the operating portion 84 with respect to the hinge portion 82 in the +Y direction. Even in the case where the regulating portion 853 is located on the side opposite to the operating portion 84 with respect to the hinge portion 82 in the +Y direction, it suffices if the regulating portion 853 is moved as the operating portion 84 is inserted into the housing body 4 so that the lid member 7 is allowed to slide in the direction for detaching from the housing body 4.

In the above embodiment, the two regulating portions 853 are arranged at positions that are line-symmetrical with respect to the central axis Ax of the locking member 8 extending in the +Y direction. However, the two regulating portions 853 is not limited to this, and do not necessarily have to be arranged at positions line-symmetrical with respect to the central axis Ax.

In the above embodiment, the locking member 8 has the two regulating portions 853. However, the present invention is not limited to this, and it is sufficient if the locking member has at least one regulating portion, and the number and arrangement of the regulating portions can be appropriately changed.

In the above embodiment, the operating portion 84 is inserted into the housing body 4 in the +Z direction which is a direction different from the +Y direction which is the first direction and the −Y direction which is opposite to the first direction. However, the present invention is not limited to this, and for example, in the case where the operating portion is exposed not on the back surface of the housing body but on the side surface, the operating device may be configured so that the operating portion is inserted into the housing body in the +X direction or the −X direction different from the ±Y direction. Further, for example, in the case where the operating portion is exposed on the upper surface, the lower surface or the like of the housing body, the operating device may be configured so that the operating portion is inserted into the housing body in the −Y direction or the +Y direction.

That is, the moving direction of the operating portion 84 when the operating portion 84 is inserted into the housing body 4, is not limited to the above.

In the above embodiment, the mounting portion 81 is located in the +Z direction with respect to the operating portion 84. That is, the mounting portion 81 and the operating portion 84 overlap each other as viewed in the +Z direction. However, not limited to this, the mounting portion 81 does not necessarily have to be positioned, with respect to the operating portion 84, in the direction in which the operating portion 84 is inserted into the housing body 4.

In the above embodiment, the lid member 7 has the hook portion 71 and the two hook portions 73. The hook portion 71 has the upright portion 711 that is erected from the inner surface 7A of the lid member 7 in the +Z direction, and the protrusion 712 that protrudes from the upright portion 711 in the +Y direction and is inserted into the slit 613 of the second member 6. Each of the two hook portions 73 has the upright portion 731 that is erected in the +Z direction from the flat portion 72 provided on the inner surface 7A, and the protrusion 732 that protrudes in the +Y direction from the upright portion 731 and is inserted into the slit 633 of the second member 6. However, the present invention is not limited to this, and the hook portion 71 may not necessarily be present, and at least one of the two hook portions 73 may not be present.

Further, each regulating portion 853 is provided on the step portion 85 so as to be able to come into contact with the upright portion 731 of the corresponding hook portion 73. However, the present invention is not limited to this, and the regulating portion 853 may be provided so as to be able to come into contact with a portion of the lid member 7 different from the hook portion 73. Further, the regulating portion 853 may be provided so as to be contactable with one hook portion 73 of the two hook portions 73. In addition, it is sufficient if the regulating portion 853 is moved together with the operating portion 84, and thus the regulating portion 853 does not necessarily have to be provided on the protrusion 852 located in the +Z direction with respect to the operating portion 84, on the step portion 85 integrated with the operating portion 84.

In the above embodiment, the operating portion 84 is exposed to the outside of the housing 3. That is, the operating portion 84 is provided at a position where the user who operates the operating device 1 can directly operate the operating portion 84. However, not limited to this, the operating portion 84 does not necessarily have to be exposed to the outside of the housing 3. For example, the operating portion may be provided inside the housing body, and the housing body may include a covering member such as a shutter that covers the operating portion. Further, for example, the operating portion may be provided inside the housing and indirectly operated by the user via a movable member provided in the housing body.

In the above embodiment, the second member 6 of the housing body 4 includes the guide portion 635 having the guide surface 635B extending to the +Y direction while increasing its inclination toward the +Z direction. However, not limited to this, the guide surface 635B does not necessarily have to be an inclined surface with respect to the XY plane and may be a surface parallel to the XY plane.

Further, the guide portion 635 does not have to be located between the slit 633 and the opening 634, and may be located, for example, on the peripheral edge of the second member 6 as viewed from the −Z direction. That is, the position of the guide portion can be changed as appropriate, and the number of guide portions can also be changed as appropriate.

In the above embodiment, the locking member 8 is provided at the end in the −Y direction of the housing body 4, which is the sliding direction when the lid member 7 is detached from the housing body 4. However, the position of the locking member in the housing body is not limited to this and can be changed as appropriate.

In the above embodiment, the locking member 8 has an opening 86 that avoids interference with the fixing member FM2 and the like, and the mounting portion 81 and the operating portion 84 are connected by the two hinge portions 82 and two connecting portions 83. However, the present invention is not limited to this, and the opening 86 is not always necessary, and the mounting portion 81 and the operating portion 84 may be connected by one hinge portion 82 and one connecting portion 83.

In the above embodiment, the locking member 8 is made of synthetic resin, and the hinge portion 82 is flexible to be elastically deformable. However, the locking member 8 is not limited to this, and may be formed of a material other than the synthetic resin. Further, the structure of the hinge portion is not limited to the above. For example, the hinge portion may have a configuration including a first joining portion connected to the mounting portion 81, a second joining portion connected to the operating portion 84 via the connecting portion 83, and an urging portion. In this case, the first joining portion and the second joining portion are rotatably combined with each other around a rotation axis in a predetermined direction, and the urging portion may urge the second joining portion and thus the operating portion 84 in the −Z direction.

In the above embodiment, the locking member 8 is held in the housing body 4 by fixing the second member 6 to the first member 5 in a state where the pins 65 are inserted into the positioning holes 812 and the insertion portion 815 is inserted into the slit 642 so that the locking member 8 is temporarily fixed to the second member 6. However, the present invention is not limited to this, and the configuration in which the locking member is held in the housing body is not limited to the above and has no particular limitation.

In the above embodiment, the operating device 1 transmits the operation signal to be transmitted to the external device by infrared rays or wirelessly. To be specific, the operating device 1 has the infrared emitting unit 26 that transmits an operating signal by emitting infrared rays corresponding to the operating signal, and the communication unit 27 that transmits the operating signal by radio waves. However, not limited to this, the operating device may have either the infrared emitting unit 26 or the communication unit 27, or may transmit an operation signal by using communication means other than infrared rays and radio waves. Further, for example, the operating device may be one that communicates with an external device by a wire. Further, the operating device 1 does not necessarily have to include the microphone 25.

In the above embodiment, the housing body 4 has a shape elongated in the +Y direction which is the first direction. However, the shape of the housing body 4 is not limited to this and can be changed as appropriate. It is to be noted that when the housing body 4 has a shape elongated in the +Y direction, the user can easily understand the sliding direction of the lid member 7 with respect to the housing body 4, and in addition, the user is allowed to grip the operating device 1 easily.

Summary of the Present Invention

The following is a summary of the present invention. The operating device according to one aspect of the present invention is an operating device including a housing, and the housing includes a housing body, a lid member that slides in a first direction with respect to the housing body to be attached to the housing body and slides in the direction opposite to the first direction to be detached from the housing body, and a locking member provided on the housing body and locking the lid member, and the locking member has a mounting portion attached to the housing body, a hinge portion connected to the mounting portion, an operating portion which is connected to the hinge portion, moves around the hinge portion, and can be inserted into and can protrude from the housing body, and a regulating portion that comes into contact with the lid member and restricts sliding of the lid member in the opposite direction, and the regulating portion is moved together with the operating portion and separated from the lid member when the operating portion is inserted into the housing body.

According to such a configuration, in a state where the lid member is attached to the housing body, the regulating portion of the locking member comes into contact with the lid member, so that the slide of the lid member in the direction opposite to the first direction with respect to the housing body, that is, the slide of the lid member in the direction in which the lid member is detached from the housing body is restricted. As a result, the detachment of the lid member from the housing body is suppressed.

On the other hand, when the operating portion is inserted into the housing body, the regulating portion is moved together with the operating portion around the hinge portion and is separated from the lid member. Due to this, the lid member is allowed to slide in the direction opposite to the first direction, and the lid member can be detached from the housing body.

In such a way, in a state where the lid member is attached to the housing body, the removal of the lid member is restricted by the regulating portion, and when the operating portion is inserted into the housing body, the lid member become detachable from the housing body. Therefore, the lid member can be prevented from being unintentionally detached from the housing body, and the lid member can be stably attached to the housing body.

In the above aspect, the housing body may have an installation portion on which a battery can be installed, and the lid member may be a battery lid that covers the installation portion.

According to such a configuration, it is possible to prevent the lid member from coming off from the housing body and the battery installed in the installation portion from being removed.

In the above aspect, the regulating portion may be located between the hinge portion and the operating portion in the first direction.

Here, in the case where the regulating portion is provided on the side opposite to the hinge portion with respect to the operating portion, the regulating portion will move significantly due to a slight movement of the operating portion toward the housing body. In this case, even a slight movement of the operating portion may cause the lid member to unintentionally come off from the housing body.

On the other hand, since the regulating portion is located between the hinge portion and the operating portion in the first direction, the movement of the regulating portion to the extent that the sliding restriction of the lid member is released by a slight movement of the operating portion can be suppressed. Therefore, the lid member can be prevented from being unintentionally detached from the housing body. In addition, the locking member can be made smaller while increasing the amount of movement of the operating portion sufficient to separate the regulating portion from the lid member.

In the above aspect, the operating portion may be inserted into the housing body in a direction different from the first direction and the opposite direction. According to such a configuration, since the sliding direction of the lid member with respect to the housing body and the insertion direction of the operating portion with respect to the housing body are different, the operation of removing the lid member from the housing body can be facilitated.

In the above aspect, the mounting portion may be positioned, with respect to the operating portion, in a direction in which the operating portion is inserted into the housing body.

According to such a configuration, since the operating portion and the mounting portion overlap in the insertion direction of the operating portion with respect to the housing body, the locking member can be made in a small size. Therefore, the mounting space of the locking member in the housing body can be reduced, and the housing, and eventually, the operating device can be miniaturized.

In the above aspect, the lid member has an upright portion that is erected toward the housing body when the lid member is attached to the housing body, and a protrusion that protrudes in the first direction from the upright portion, and the housing body has a hole into which the protrusion is inserted when the lid member is attached to the housing body, and the regulating portion may be provided so as to be contactable with the upright portion when the lid member is attached to the housing body.

According to such a configuration, the protrusion inserted into a hole comes in contact with the edge of the hole, so that the movements of the lid member with respect to the housing body in the first direction and a direction intersecting with the first direction are restricted. Further, the regulating portion comes in contact with the upright portion integrally provided with the protrusion, so that the movement of the lid member with respect to the housing body in the direction opposite to the first direction is restricted. Therefore, the lid member can be stably attached to the housing body.

In the above aspect, a plurality of the regulating portions may be provided at positions that are line-symmetrical with respect to the central axis of the locking member extending in the first direction.

According to such a configuration, the detachment of the lid member is regulated by a plurality of regulating portions. Therefore, the state in which the lid member is attached to the housing body 4 can be stably maintained.

In the above aspect, the operating portion may be exposed to the outside of the housing.

According to such a configuration, the lid member can be detached from the housing body by inserting the operating portion exposed to the outside of the housing into the housing body. Therefore, the operation of removing the lid member from the housing body can be easily performed.

In the above aspect, the housing body has a guide portion for guiding the slide of the lid member in the first direction and the opposite direction, and the guide portion may have a guide surface that is inclined in a direction so that the lid member becomes closer to the housing body as the lid member moves in the first direction.

According to such a configuration, in the case where the lid member slides in the first direction, the lid member becomes closer to the housing body. As a result, the lid member can be attached to the housing body in a state where the housing body and the lid member are close to each other. In the case where the lid member slides in the direction opposite to the first direction, the lid member is separated from the housing body. This makes it easier to remove the lid member from the housing body.

In the above aspect, the locking member may be provided at the end of the housing body in the opposite direction. According to such a configuration, the locking member is provided at the end in the sliding direction of the lid member regulated by the regulating portion in the housing body. According to this, when the lid member is detached from the housing body, the lid member can be easily slid in the direction opposite to the first direction. Therefore, the operation of removing the lid member from the housing body can be facilitated.

REFERENCE SIGNS LIST

1: Operating device
2: Device main body
21: Circuit board
25: Microphone
26: Infrared emitting unit
3: Housing
4: Housing body
5: First member
6: Second member
62: Installation portion
633: Slit (Hole)
635: Guide portion
635B: Guide surface
7: Lid member
73: Hook portion
731: Upright portion
732: Protrusion
8: Locking member
81: Mounting portion
82: Hinge portion
83: Connecting portion
84: Operating portion
85: Step portion
853: Regulating portion
Ax: Central axis
BT: Battery
FM1, FM2: Fixing member

The invention claimed is:
1. An operating device comprising:
a housing,
the housing including
a housing body,
a lid member that slides in a first direction with respect to the housing body to be attached to the housing body and slides in a direction opposite to the first direction to be detached from the housing body, and
a locking member provided on the housing body and locking the lid member, wherein the locking member includes
a mounting portion attached to the housing body,
a hinge portion connected to the mounting portion,
an operating portion that is connected to the hinge portion, moves around the hinge portion, and is inserted into and protrude from the housing body, and
a regulating portion that comes into contact with the lid member and restricts a slide of the lid member in the opposite direction, and
the regulating portion is moved together with the operating portion and separated from the lid member when the operating portion is inserted into the housing body,
wherein the mounting portion is located, with respect to the operating portion, in a direction in which the operating portion is inserted into the housing body.

2. The operating device according to claim 1, wherein the housing body has an installation portion where a battery is installed, and the lid member is a battery lid that covers the installation portion.

3. The operating device according to claim 1, wherein the regulating portion is located between the hinge portion and the operating portion in the first direction.

4. The operating device according to claim 1, wherein the operating portion is inserted into the housing body in a direction different from the first direction and the opposite direction.

5. The operating device according to claim 1, wherein the lid member includes
- an upright portion that is erected toward the housing body when the lid member is attached to the housing body, and
- a protrusion projecting in the first direction from the upright portion, the housing body has a hole into which the protrusion is inserted when the lid member is attached to the housing body, and
- the regulating portion is provided so as to be contactable with the upright portion when the lid member is attached to the housing body.

6. The operating device according to claim 1, wherein a plurality of the regulating portions are provided at positions that are line-symmetrical with respect to a central axis of the locking member extending along the first direction.

7. The operating device according to claim 1, wherein the operating portion is exposed to an outside of the housing.

8. The operating device according to claim 1, wherein the housing body has a guide portion that guides the slide of the lid member in the first direction and the opposite direction, and
- the guide portion has a guide surface inclined so that the lid member becomes closer to the housing body as the lid member moves in the first direction.

9. The operating device according to claim 1, wherein the locking member is provided at an end in the opposite direction of the housing body.

\* \* \* \* \*